United States Patent
Cui et al.

(10) Patent No.: US 10,726,350 B2
(45) Date of Patent: Jul. 28, 2020

(54) METHOD AND SYSTEM FOR EFFICIENT QUANTUM TERNARY ARITHMETIC

(71) Applicant: Microsoft Technology Licensing, LLC, Redmond, WA (US)

(72) Inventors: Xingshan Cui, Goleta, CA (US); Alexei Bocharov, Redmond, WA (US); Martin Roetteler, Woodinville, WA (US); Krysta Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 15/779,843

(22) PCT Filed: Nov. 18, 2016

(86) PCT No.: PCT/US2016/062643
§ 371 (c)(1),
(2) Date: May 29, 2018

(87) PCT Pub. No.: WO2017/095652
PCT Pub. Date: Jun. 8, 2017

(65) Prior Publication Data
US 2018/0365583 A1    Dec. 20, 2018

Related U.S. Application Data

(60) Provisional application No. 62/261,179, filed on Nov. 30, 2015.

(51) Int. Cl.
*G06N 10/00* (2019.01)
*G06F 7/503* (2006.01)

(52) U.S. Cl.
CPC ............. *G06N 10/00* (2019.01); *G06F 7/503* (2013.01)

(58) Field of Classification Search
CPC ...................... G06N 10/00; G06F 7/50–5095
(Continued)

(56) References Cited

U.S. PATENT DOCUMENTS

| | | |
|---|---|---|
| 6,671,678 B1 | 12/2003 | Wang |
| 7,772,999 B2 | 8/2010 | Lablans |

(Continued)

FOREIGN PATENT DOCUMENTS

| | | |
|---|---|---|
| CN | 101739232 A | 6/2010 |
| CN | 103235710 A | 8/2013 |

OTHER PUBLICATIONS

V. Vedral et al., Quantum networks for elementary arithmetic operations, Physical Review A, vol. 54, No. 1, 1996 (Year: 1996).*

(Continued)

*Primary Examiner* — Andrew Caldwell
*Assistant Examiner* — Emily E Larocque
(74) *Attorney, Agent, or Firm* — Klarquist Sparkman, LLP

(57) ABSTRACT

Ripple-carry and carry look-ahead adders for ternary addition and other operations include circuits that produce carry values or carry status indicators that can be stored on qutrit registers associated with input values to be processed. Inverse carry circuits are situated to reverse operations associated with the production of carry values or carry status indicators, and restored values are summed with corresponding carry values to produce ternary sums.

16 Claims, 23 Drawing Sheets

(58) Field of Classification Search
USPC .................................................. 708/707, 710
See application file for complete search history.

(56) References Cited

U.S. PATENT DOCUMENTS

| | | |
|---|---|---|
| 2009/0299947 A1 | 12/2009 | Amin et al. |
| 2013/0246495 A1 | 9/2013 | Svore et al. |
| 2014/0026108 A1 | 1/2014 | Bocharov et al. |
| 2014/0297708 A1 | 10/2014 | Svore et al. |

OTHER PUBLICATIONS

V.E. Zobov et al., Adder on Ternary Base Elements for a Quantum Computer, JETP Letters, vol. 89, No. 5, 2009 (Year: 2009).*

Md. M. Hasan, A Low-Cost Realization of Quantum Ternary Adder Using Muthukrishnan-Stroud Gate, ICECE 2008 (Year: 2008).*

B. Mondal et al., Synthesis of Balanced Ternary Reversible Logic Circuit, 2013 IEEE 43rd International Symposium on Multiple-Valued Logic, IEEE Computer Society, 2013 (Year: 2013).*

V.G. Deibuk, Synthesis of a ternary reversible/quantum devices, Proc., 5th International Scientific Conference Information Technology and Computer Engineering, May 2015 (Year: 2015).*

Khan et al., "Quantum Ternary Parallel Adder/Subtractor with Partially-Look-Ahead Carry," Journal of Systems Architecture, 53:453-464 (2007).

Yang et al., "Realizing Ternary Quantum Switching Networks without Ancilla Bits," available at: http://arxiv.org/pdf/0509192v1, pp. 1-10 (Sep. 27, 2005).

Alvarez-Rodriguez et al., "The Forbidden Quantum Adder," available at: http://arxiv.org/pdf/1411.4534v2, pp. 1-3 (May 29, 2015).

Mandal et al., "Quantum Ternary Circuit Synthesis Using Projection Operations," available at: http://arxiv.org/pdf/1205.2390v1, pp. 1-20 (May 9, 2012).

Li et al., "Logic Synthesis of Ternary Quantum Circuits with Minimal Qutrits," Journal of Computers, 8:1941-1946 (Aug. 2013).

Mandal et al., "Synthesis Techniques for Ternary Quantum Logic," Proceedings of 41st IEEE International Symposium on Multiple-Valued Logic, pp. 218-223 (May 23, 2011).

Klimov et al., "Quantum phases of a Qutrit," available at: http://arxiv.org/pdf/0312127v1, pp. 1-6 (Dec. 15, 2003).

Perkowski et al., "Multiple-Valued Quantum Logic Synthesis," 2002 International Symposium on New Paradigm VLSI Computing, 59 pages (Dec. 12, 2002).

Yang et al., "Universality of 2-Qudit Ternary Reversible Gates," J. Phys. A:Math. Gen., 39:7763-7773 (May 31, 2006).

Satoh et al., "A Reversible Ternary Adder for Quantum Computation," Asian Conf. on Quantum Information Science, 3 pages, (Sep. 3, 2007).

Draper et al., "A Logarithmic-Depth Quantum Carry-Lookahead Adder," available at: http://arxiv.org/pdf/0406142v1, pp. 1-21 (Jun. 20, 2004).

Cuccaro et al., "A New Quantum Ripple-Carry Addition Circuit," available at: http://arxiv.org/pdf/0410184v1, pp. 1-9 (Oct. 22, 2004).

Thomsen et al., "Parallel Optimization of a Reversible (Quantum) Ripple-Carry Adder," Unconventional Computing, Lecture Notes in Computer Science 5204, pp. 228-241 (2008).

Bocharov et al., "Improved Quantum Ternary Arithmetics," available at: http://arxiv.org/pdf/1512.03824v2, pp. 1-22.

International Search Report and Written Opinion from International Application No. PCT/US2016/062643, dated Feb. 17, 2017, 11 pages.

\* cited by examiner

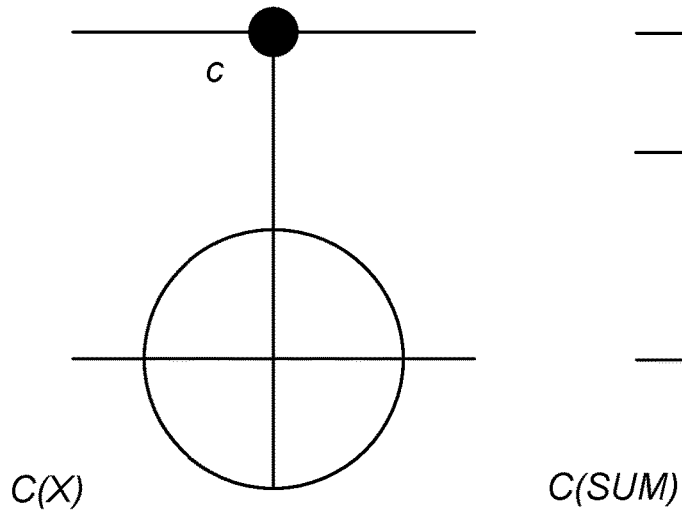
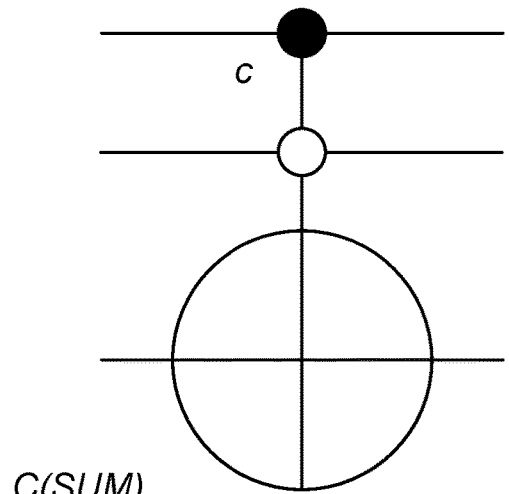
FIG. 1E
FIG. 1F
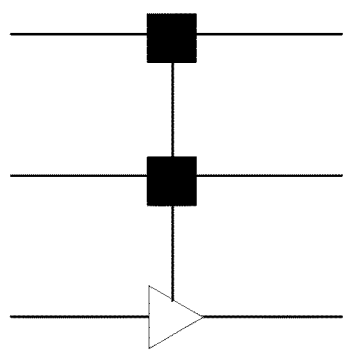
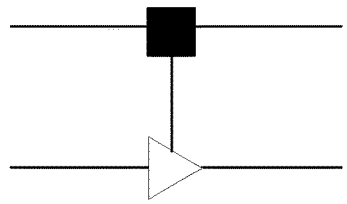
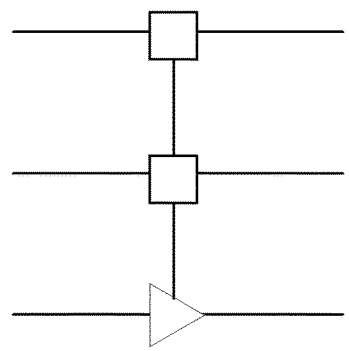
FIG. 1G
FIG. 1H
FIG. 1I

|  | $c_{i+1} = 0$ | $c_{i+1} = 1$ | $c_{i+1} = 2$ |
|---|---|---|---|
| $a_i$ | 000112001 | 011222122 | 000111222 |
| $b_i$ | 012010010 | 212012212 | 012012012 |
| $c_i$ | 000000111 | 111111000 | 222222222 |

FIG. 2

| | $c_{i+1} = 0$ | | | $c_{i+1} = 1$ | | |
|---|---|---|---|---|---|---|
| $a_i$ | 0 | 0 | 1 | 1 | 2 | 2 |
| $b_i$ | 0 | 1 | 0 | 2 | 1 | 2 |
| $c_i$ | 1 | 1 | 1 | 0 | 0 | 0 |

$\xrightarrow{S_{00,22}}$

| | $c_{i+1} = 0$ | | | $c_{i+1} = 1$ | | |
|---|---|---|---|---|---|---|
| $a_i$ | 2 | 0 | 1 | 1 | 2 | 0 |
| $b_i$ | 2 | 1 | 0 | 2 | 1 | 0 |
| $c_i$ | 1 | 1 | 1 | 0 | 0 | 0 |

FIG. 3

|     | $c_{i+1} = 0$ | $c_{i+1} = 1$ | $c_{i+1} = c_i$ |
|-----|---------------|---------------|-----------------|
| $a_i$ | 0  0  1     | 1  2  2       | 0  1  2         |
| $b_i$ | 0  1  0     | 2  1  2       | 2  1  0         |
FIG. 9
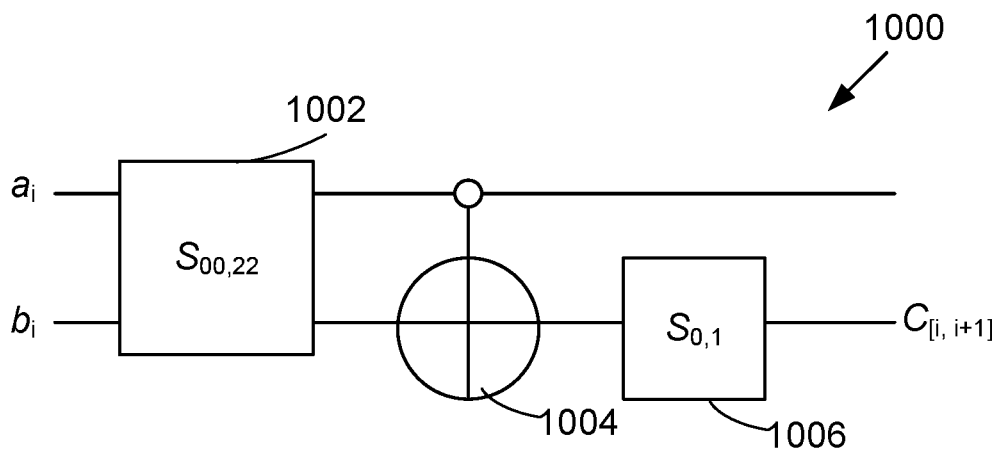
FIG. 10
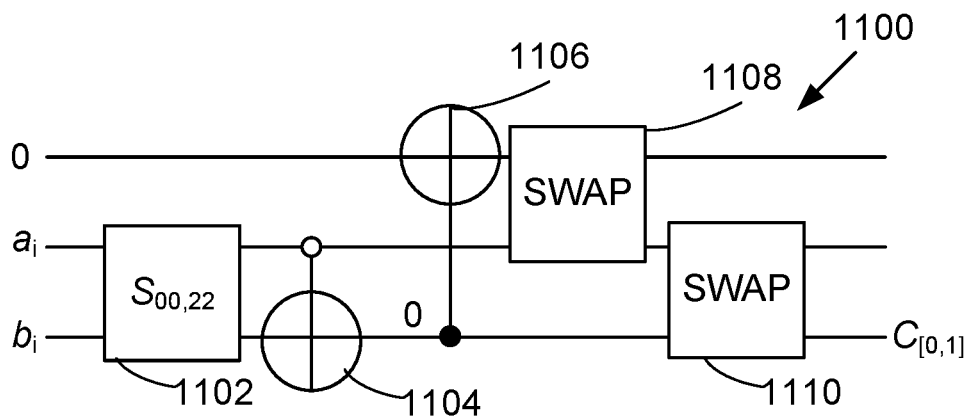
FIG. 11

| ⊙ | $C[k,j]$ | | |
|---|---|---|---|
|   | 0 | 1 | 2 |
| $C[i,k]$ 0 | 0 | 1 | 0 |
| 1 | 0 | 1 | 1 |
| 2 | 0 | 1 | 2 |

$C[i,k] \odot C[k,j]$

FIG. 24
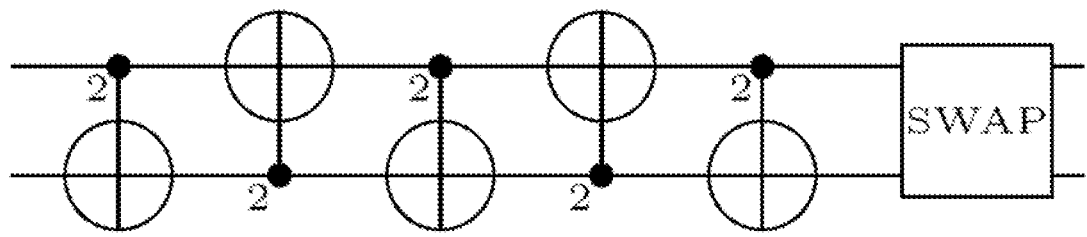
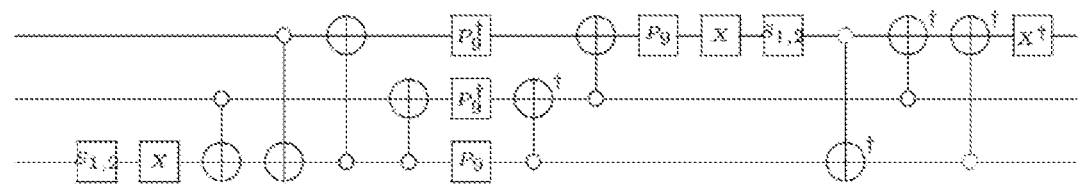
FIG. 25
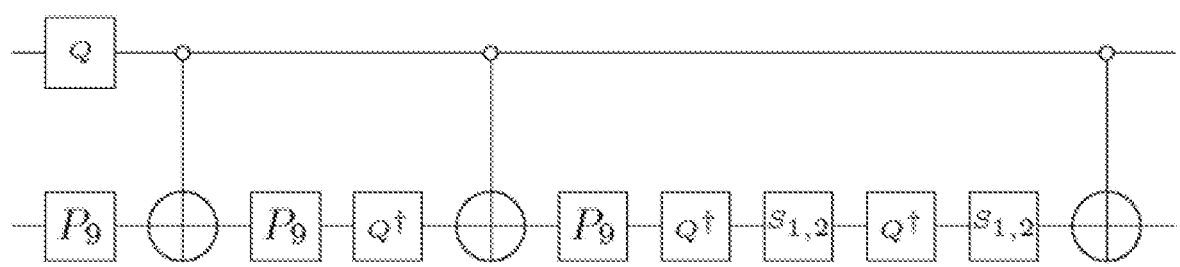
FIG. 26

METHOD AND SYSTEM FOR EFFICIENT QUANTUM TERNARY ARITHMETIC

CROSS REFERENCE TO RELATED APPLICATIONS

This is the U.S. National Stage of International Application No. PCT/US2016/062643, filed Nov. 18, 2016, which was published in English under PCT Article 21(2), which in turn claims the benefit of U.S. Provisional Application No. 62/261,179, filed Nov. 30, 2015. The provisional application is incorporated herein in its entirety.

TECHNICAL FIELD

The disclosure pertains to circuits, circuit synthesis, and methods for quantum ternary arithmetic.

BACKGROUND

Quantum circuits for performing arithmetic operations are an essential part of key quantum algorithms such as Shor's factorization, discrete logarithm, hidden subgroup algorithms and others. The importance of quantum ternary logic for applications such as quantum key distribution has been understood since late 1980s. Recently, ternary arithmetic has become important in quantum computing due to potential architectural platforms grounded in ternary representation, for example in the metaplectic any on architecture. Ternary quantum logic may also be relevant for other architectural platforms such as quantum dots, where higher energy levels can be used to store additional logic states. While ternary hardware architectures have been investigated, satisfactory circuits and procedures for ternary arithmetic and ternary quantum logic for algorithm and circuit compilation are generally unavailable.

SUMMARY

Ternary adders include a series of carry circuits that compute carry values associated with processing of two input values, followed by a series of inverse carry circuits that return qutrit register values to the input values. Sum values are then provided on qutrits associated with the input values. In some examples, carry status indicators are used to determine carry values so that ternary addition and other operations can be performed so that some stages can be executed in parallel. These ternary circuits and others can be synthesized in a supermetaplectic basis.

These and other features and aspects of the disclosed technology are set forth below with reference to the accompanying drawings.

BRIEF DESCRIPTION OF THE DRAWINGS

FIG. 1E is a schematic diagram illustrating a ternary controlled-X gate.

FIG. 1F is a schematic diagram illustrating a ternary controlled-SUM gate.

FIG. 1G is a schematic diagram illustrating a carry status circuit that determines a carry status indicator C[0,1].

FIG. 1H is a schematic diagram illustrating a carry status circuit that determines a carry status indicator C[i,i+1].

FIG. 1I is a schematic diagram illustrating a merging circuit that determines carry status indicators C[i,j] based on carry stat indicators C[0,1] and C[i,i+1].

FIG. 2 is a ternary arithmetic table illustrating carry trit values associated with various combinations of input trit values and an input carry trit value.

FIG. 3 illustrates operation of an $S_{00,22}$ circuit.

FIG. 9 summarizes relationships between carry trit values $c_i$ and $c_{i+1}$.

FIG. 10 is a schematic diagram illustrating a quantum circuit that produces carry status indicators C[i,i+1] associated with $i^{th}$ trits of two n-qutrit registers, wherein 0≤i<n and n, i are positive integers.

FIG. 11 is a schematic diagram illustrating a quantum circuit that produces carry status indicators C[0,1] associated with two n-qutrit registers, wherein n is a positive integer.

FIG. 24 shows a representative implementation of a circuit for $S_{01,10}$.

FIG. 25 illustrates a representative circuit for $\vee(\vee(Z))$ using the supermetaplectic basis.

FIG. 26 illustrates a representative circuit for $C_2(Z)$ using the supermetaplectic basis.

DETAILED DESCRIPTION

Figure 1A:
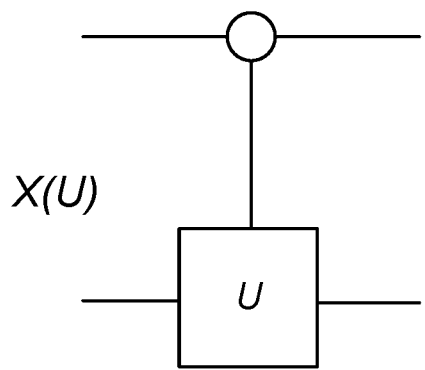
FIG. 1A is a schematic diagram illustrating a ternary soft control gate $\vee(U):|i,j\rangle \leftrightarrow |i\rangle \otimes U^i|j\rangle$, wherein U is an arbitrary single qutrit gate.
Figure 1B:
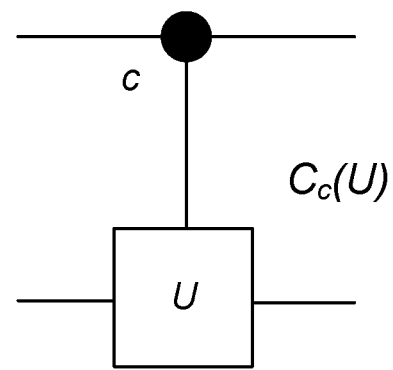
FIG. 1B is a schematic diagram illustrating a ternary controlled-U gate.
Figure 1C:
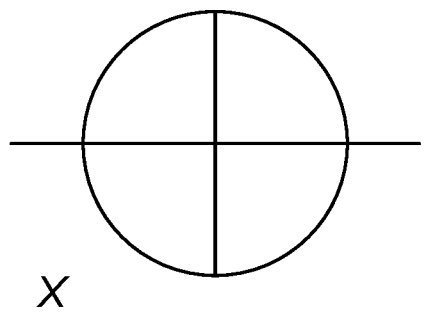
FIG. 1C is a schematic diagram illustrating a ternary X-gate.
Figure 1D:
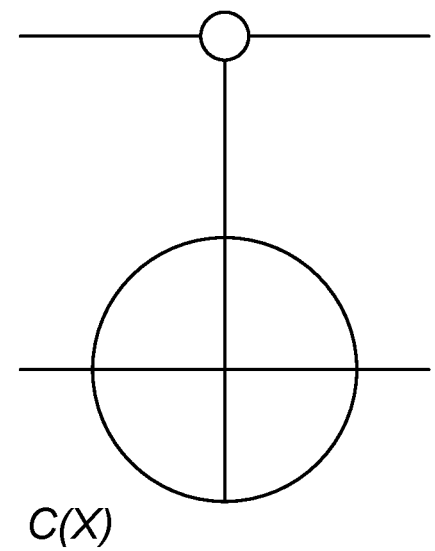
FIG. 1D is a schematic diagram illustrating a ternary sum gate.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best," "minimum," or the like. It will be appreciated that such descriptions are intended to indicate that a selection among many used functional alternatives can be made, and such selections need not be better, smaller, or otherwise preferable to other selections.

Disclosed herein are methods, apparatus, and quantum circuits pertaining to the synthesis of reversible ternary arithmetic circuits and corresponding circuits and methods. In addition, circuit synthesis using a supermetaplectic basis and circuits defined in this basis are disclosed. In some examples, ternary adders are described that are referred to as ripple carry adders and carry look-ahead adders. In one representative example, a ripple carry adder that adds 2 n-trit numbers requires only one ancilla qutrit and has a circuit depth of $O(n)$; a corresponding carry save adder requires $O(n)$ ancilla qutrits and has a circuit depth of $O(\log n)$.

Notation and Definitions

Quantum operations are described below with reference to one or more qutrits which represent three states. Qutrit operations can be described with reference to a qutrit computational basis $|0\rangle, |1\rangle, |2\rangle$. Qutrits can be implemented in variety of ways using quantum mechanical systems that can assume three values. For convenient illustration, evolution of the state of a particular qutrit and couplings to other qutrits are shown in the drawings along lines so that evolution progresses from left to right. Corresponding matrix representations are obtained as products from right to left. Numbers can be represented by a series of ternary digits so that an n-trit number a can be expressed as $a = a_{n-1}3^{n-1} + a_{n-2}3^{n-2} + \ldots + a_1 3 + a_0$, wherein the $a_i$ are referred to as trit values and possible values for $a_i$ are 0, 1, and 2. A qutrit used in computation can be referred to as an ancilla or ancilla qutrit. A set of qutrits that are used to represent trit values associated with a multi-trit ternary number is referred to as a register or a quantum register.

Some gates used in the following description are defined below. Gates are typically described with reference to associated mathematical operations that are implemented by the gates. Circuit implementations of any particular operations are generally based on combinations of one or more basis gates selected from a set of basis gates. In qutrit arithmetic as used herein, arithmetic within a ket is modulo 3 arithmetic. In gate definitions, $\zeta_n = e^{2\pi i/n}$.

$$X: |i\rangle \to |i+1\rangle, \text{ i.e., } X = \begin{pmatrix} 0 & 0 & 1 \\ 1 & 0 & 0 \\ 0 & 1 & 0 \end{pmatrix}$$

$$Z: |i\rangle \to \zeta_3^i |i+1\rangle, H: |i\rangle \to \frac{1}{\sqrt{3}} \sum_j \zeta_3^{ij} |j\rangle$$

$$S_{0,1}: |0\rangle \leftrightarrow |1\rangle, S_{00,22}: |00\rangle \leftrightarrow |22\rangle$$

$$\text{Soft control } \Lambda(U): |i, j\rangle \leftrightarrow |i\rangle \otimes U^i |j\rangle$$

$$\text{Hard control } C(U): |i, j\rangle \leftrightarrow |i\rangle \otimes U^{\delta_{i,c}} |j\rangle$$

$$\text{SUM} \equiv \Lambda(X): |i, j\rangle \to |i, i+j\rangle$$

$$C(X) = C_c(X): |i, j\rangle \leftrightarrow |i\rangle \otimes U|i, j+\delta_{i,c}\rangle$$

$$\text{HORNER} \equiv \Lambda(\text{SUM}): |i, j, k\rangle \to |i, j, ij+k\rangle$$

$$C(\text{SUM}) = C_c(\text{SUM}): |i, j, k\rangle \to |i, j, k+j\delta_{i,c}\rangle$$

The gate C(X) is referred to as the controlled-increment gate and can be represented as:

$$C(X) = \begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 0 & 0 & 1 \\ 0 & 0 & 0 & 0 & 0 & 0 & 1 & 0 & 0 \\ 0 & 0 & 0 & 0 & 0 & 0 & 0 & 1 & 0 \end{pmatrix},$$

wherein 2-qutrit states $a|00\rangle + b|01\rangle + c|02\rangle + d|10\rangle + e|11\rangle + f|12\rangle + g|20\rangle + h|21\rangle + i|22\rangle$ are represented as column vectors of the form:

$$\begin{pmatrix} a \\ b \\ c \\ d \\ e \\ f \\ g \\ h \\ i \end{pmatrix}$$

The single qutrit gate $S_{0,1}$ is only one example as gates $S_{0,2}$ and $S_{1,2}$ can be similarly defined. These gates can be referred to as one trit swap gates.

The qutrit Clifford group is generated by the SUM, X, H, Q gates, wherein:

$$H = \begin{pmatrix} 1 & 1 & 1 \\ 1 & \zeta_3 & \zeta_3^2 \\ 1 & \zeta_3^2 & \zeta_3 \end{pmatrix} \text{ and}$$

$$Q = \begin{pmatrix} 1 & 0 & 0 \\ 0 & 1 & 0 \\ 0 & 0 & \zeta_3 \end{pmatrix}.$$

Some of these gates are illustrated in FIGS. 1A-1F. The Clifford gates X, Z, H, $S_{0,1}$, and SUM can generally be implemented so as to be computationally efficient or "cheap"; the non-Clifford gates C(X), Horner, C(SUM), and $S_{00,22}$ are generally relatively expensive, and for this reason, the effectiveness of circuits and methods can be based on the numbers and arrangements of these gates. C(SUM), $S_{00,22}$, and C(X) can each be constructed from 5 C(X) gates; the number C(X) gates can be used as measure of complexity. Gates such as $S_{0,1}$ and $S_{00,22}$ are referred to herein as single trit swap gates and two trit swap gates, respectively.

Figure 1J:
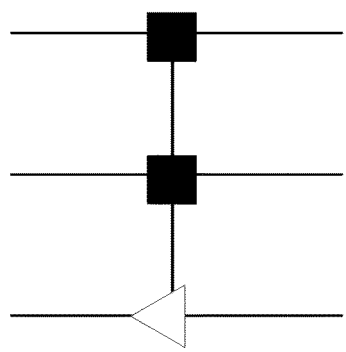
FIG. 1J is a schematic diagram illustrating an inverse of a carry status circuit that determines a carry status indicator C[0,1].
Figure 1K:
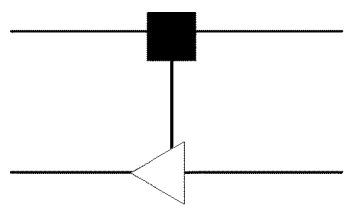
FIG. 1K is a schematic diagram illustrating an inverse of a carry status circuit that determines a carry status indicator C[i,i+1].
Figure 1L:
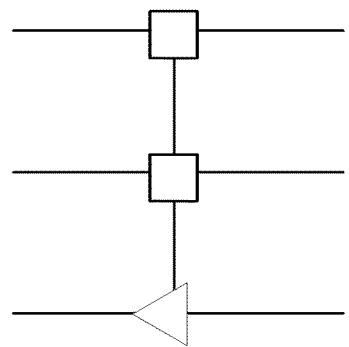
FIG. 1L is a schematic diagram illustrating an inverse of a merging circuit that determines carry status indicators C[i,j] based on carry status indicators C[0,1] and C[i,i+1] so as to permit restoration of trit values input to a carry look-ahead adder circuit.

Some additional gates used in carry look-ahead circuits are illustrated in FIGS. 1G-1I. Carry status gates $AdjC_0$ and AdjC and a merge gate M are discussed below with reference to carry look-ahead adders. Graphical representations are shown in FIGS. 1G-1I; inverses are shown in FIGS. 1J-1L. Filled-in rectangles indicate that the associated qutrit values can be changed by application of the gate; blank boxes indicate qutrit values that are unchanged.

Any of the above gates can have various implementations depending on a basis gate set to be used.

Ternary Adders

Disclosed below are circuits and methods for adding n-trit numbers a, b using carry trits $c_i$. The approaches described are referred as ripple carry adders and carry look-ahead adders which can be implemented using the gates C(X), C(SUM), $C(S_{0,1})$, $S_{00,22}$. The gates C(SUM), $C(S_{0,1})$, $S_{00,22}$ can be constructed from C(X) and Clifford operations. However, these gates can be otherwise implemented, as may be preferred.

Ripple Carry Adders

For ternary adders described herein, a carry trit $c_i$ can have a value of 0 or 1, but never 2. FIG. 2 shows combinations of trit values $a_i, b_i$ and carry values that are associated with carry trit values $c_{i+1}$. For a carry trit value $c_i=2$ (which does not occur in trit addition), the carry trit value $c_{i+1}$ is defined to be $c_{i+1}=2$. With this definition, $c_{i+1}$ is a balanced function, i.e., there are the same number of inputs corresponding to each output. As illustrated in FIG. 2, $c_{i+1}$ is the same as $c_i$ for all but six inputs, the last three in the columns $c_i=0$ and $c_i=1$. For each of these inputs, $c_{i+1}=1-c_i$. Applying the gate $S_{00,22}$ to qutrits associated with $a_i, b_i$ carries out the transformation shown in FIG. 3. The transformed values correspond to the set $\{(a,b,c) \in (\{0,1,2\}^3 : a+b=c, c \neq 2\}$. A reversible circuit, referred to as Carry or a Carry Circuit, is defined that receives values $a_i, b_i$ and a carry $c_i$ and produces a carry $c_{i+1}$ in the qutrit associated with $b_i$. In other examples, the carry value can be stored in qutrits associated with either summand, or partially in qutrits associated with each summand.

Figure 4:
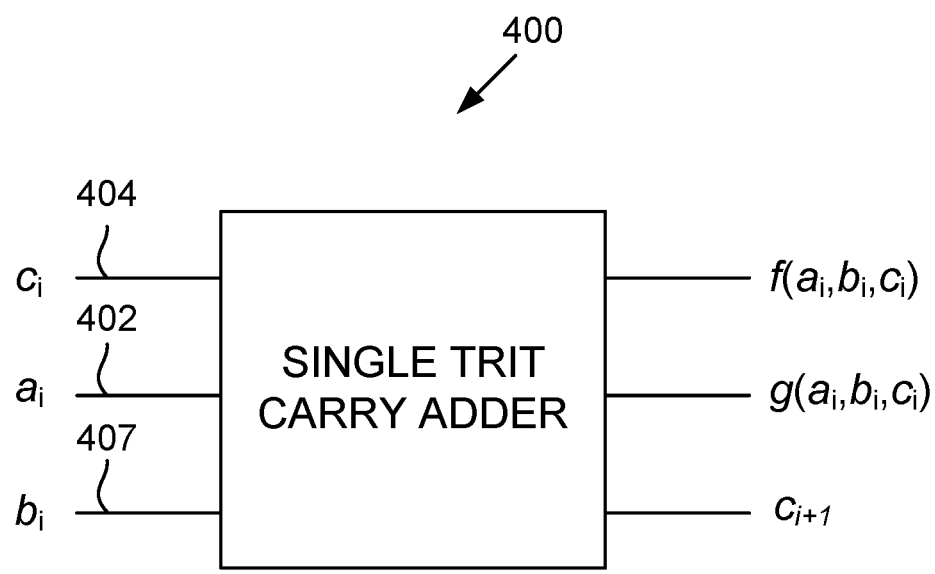
FIG. 4 is a schematic diagram illustrating a quantum single trit carry circuit that produces a carry value based on input trit values stored in a quantum register and an input carry value received from a carry qutrit.

With reference to FIG. 4, a representative carry circuit 400 (a single trit carry adder) based on the above is coupled to qutrits 402, 407 that are associated with trit values $a_i, b_i$ to be added, and a qutrit 404 is used for an input carry value $c_i$. The carry circuit 400 provides the qutrits 404, 402 with values associated with functions $f(a_i, b_i, c_i), g(a_i, b_i, c_i)$ of the input trit values and the input carry value, and the qutrit 407 (associated with the input trit values) provides an output carry value $c_{i+1}$. As discussed below, an inverse carry circuit be coupled to a carry circuit such as the circuit 400 so that trit values $a_i, b_i$ are available.

Figure 5:
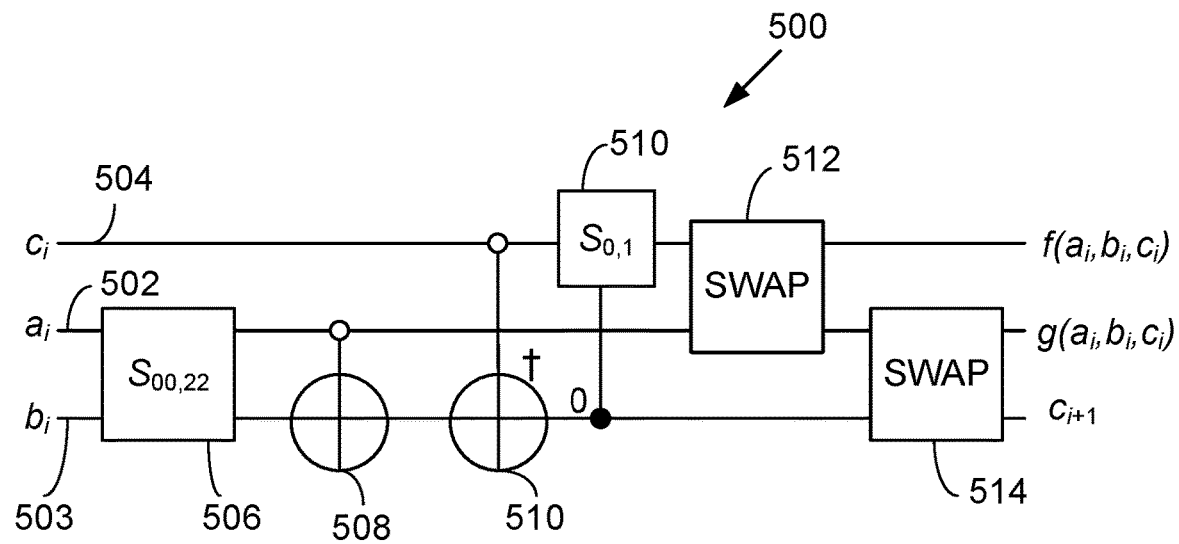
FIG. 5 is a schematic diagram illustrating a representative implementation of a quantum single trit carry circuit that produces a carry value based on input trit values stored in a quantum register.
Figure 6:
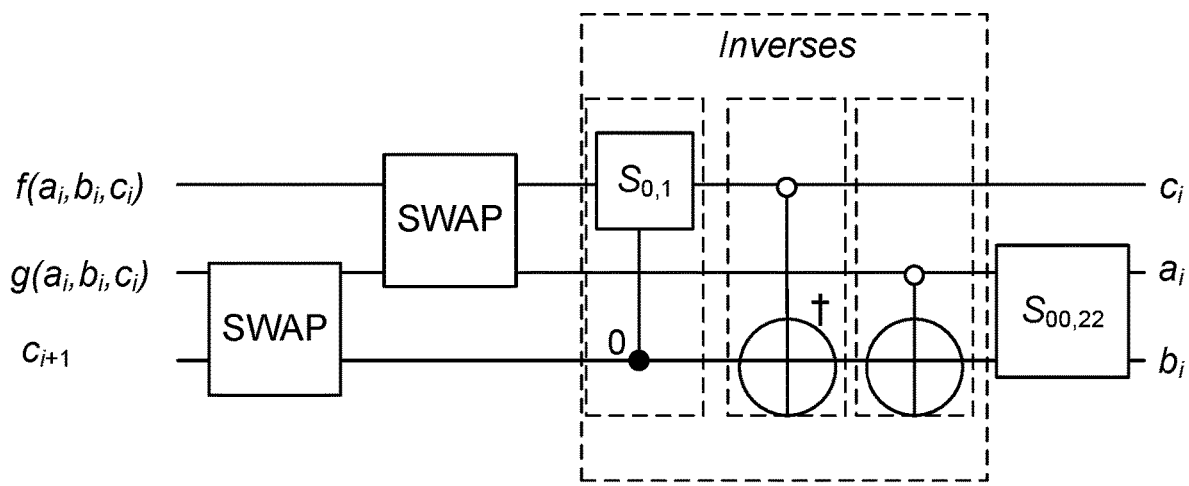
FIG. 6 is a schematic diagram illustrating an inverse of the carry circuit of FIG. 5.

Referring to FIG. 5, a representative carry-adder circuit 500 is coupled to qutrits 502, 503 that are associated with values $a_i, b_i$ and a qutrit 504 associated with a carry value $c_i$. A two qutrit swap gate 506 is coupled to the qutrits 502, 503 and a SUM gate 508 produces a sum $a_i+b_i$ at the qutrit 503 followed by a SUM gate 510 that produces a sum $a_i+b_i+c_i$ at the qutrit 503. A one trit swap gate $S_{0,1}$ 510 is coupled to the qutrits 503, 504 followed by SWAP gates 512, 514 that are coupled to qutrits 502, 504 and 502, 503, respectively. A carry value $c_{i+1}$ is then available at the qutrit 503 and function values $f(a_i, b_i, c_i), g(a_i, b_i, c_i)$ are available at the qutrits 504, 502, respectively. The values of the functions $f(a_i, b_i, c_i), g(a_i, b_i, c_i)$ appear as outputs of the carry circuit 500 as shown, but these values can be processed to return input values as needed using inverse operations as discussed below. FIG. 6 illustrates an inverse carry circuit 600.

Figure 7:
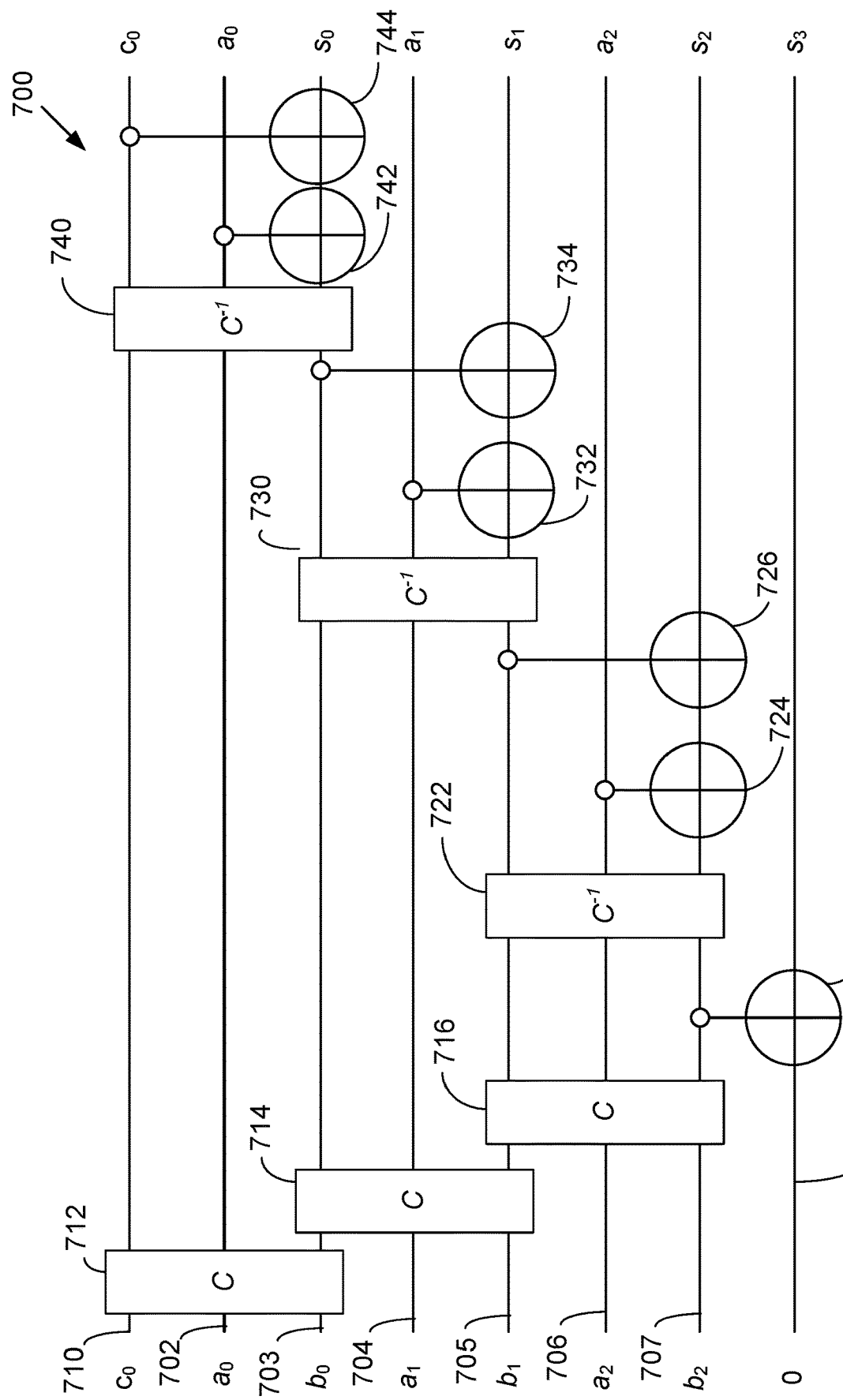
FIG. 7 is a schematic diagram illustrating a quantum ripple look-ahead adder for ternary addition of values obtained from two 3-qutrit quantum registers.

Referring to FIG. 7, a three-trit quantum adder 700 includes input qutrits 702, 704, 706 that form a three-trit register and that are associated with low, medium, and high trit values $a_0, a_1, a_2$, respectively. The three-trit quantum adder 700 also includes input qutrits 703, 705, 707 that form a three-trit register and that are associated with low, medium, and high trit values $b_0, b_1, b_2$, respectively.

A first carry-adder circuit 712 is coupled to receive a carry value $c_0$ and low order trit values $a_0, b_0$ and produce a carry value $c_1$ on the qutrit 703. A second carry-adder circuit 714 is coupled to the first carry-adder circuit 712 and to medium trit values $a_1, b_1$ followed by a third carry circuit 716 that is coupled to the second carry-adder circuit 714 and high trit values $a_2, b_2$. In this way, carry values $c_1$ and $c_2$ are produced on the qutrits 705, 707. A SUM gate 718 couples the carry trit value $c_2$ as an overflow trit value $s_3$ to an ancilla qutrit 720.

An inverse carry-adder circuit 722 is coupled to the qutrits 706, 706, 707 to restore input trit values $a_2$, $b_2$ and a SUM circuit 724 is coupled to the qutrits 706, 707 to produce a sum $a_2+b_2$; a SUM circuit 726 is coupled to the qutrits 705, 707 to produce a sum $a_2+b_2+c_2$ that is provided on the qutrit 707 as a high sum trit value $s_2$.

An inverse carry-adder circuit 730 is coupled to the qutrits 703, 704, 705 to restore input trit values $a_1$, $b_1$. A SUM circuit 732 is coupled to the qutrits 704, 705 to produce a sum $a_1+b_1$; a SUM circuit 734 is coupled to the qutrits 703, 704 to produce a sum $a_1+b_1+c_1$ that is provided on the qutrit 703 as medium sum trit value $s_1$.

An inverse carry-adder circuit 740 is coupled to the qutrits 710, 702, 703 to restore input trit values $a_0$, $b_0$. SUM circuits 742, 744 are coupled to the qutrits 702, 703 to produce a sum $a_0+b_0+c_0$ that is provided on the qutrit 703 as a low sum trit value $s_0$. In some cases, the input carry value is assumed to be zero and the SUM circuit 744 can be omitted.

As shown in FIG. 7, function values $f(a_i,b_i,c_i), g(a_i,b_i,c_i)$ produced by carry-adder circuits along with carry values are processed by inverse carry adder circuits so as to permit recovery of input values for addition operations. In the example of FIG. 7, a sum is stored in qubits associated with an input summand b; in other examples, a sum can be stored in qubits associated with summand a or in some qutrits of each of the summands a and b.

Figure 8:
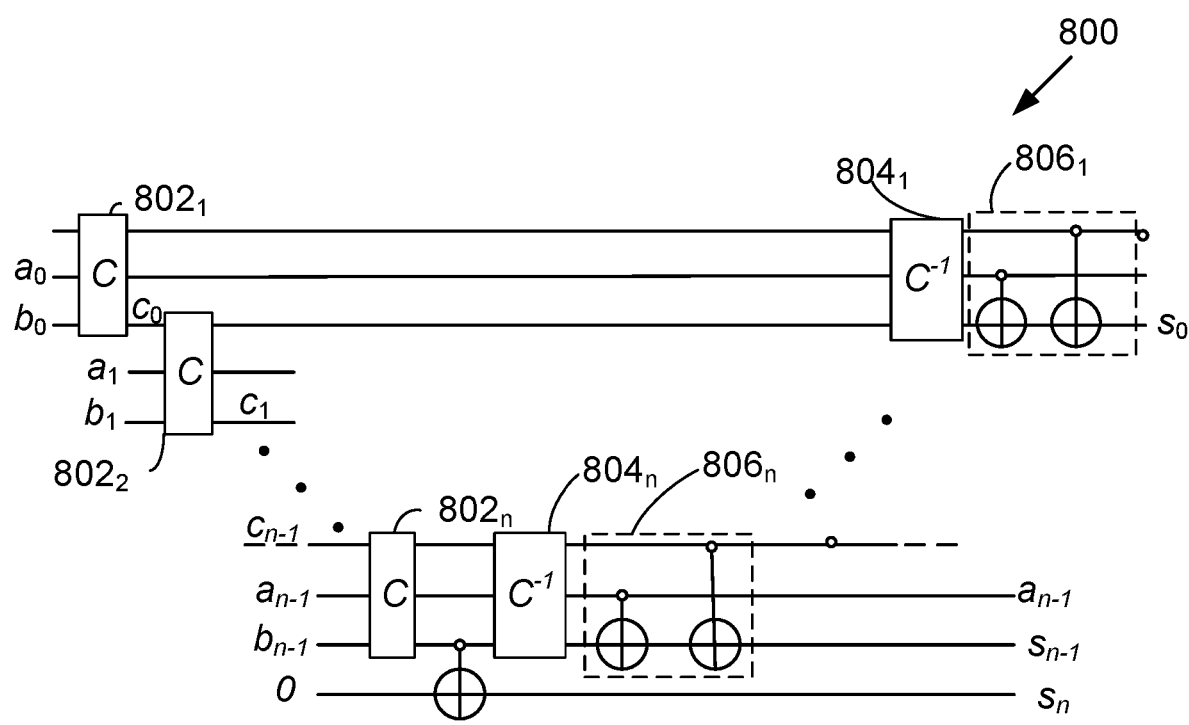
FIG. 8 is a schematic diagram illustrating an n-trit quantum ripple look-ahead adder for ternary addition.

FIG. 8 illustrates a ripple-carry adder 800 that provides ternary addition of n-trit ternary numbers. Carry-adder circuits $802_j$, j=1, . . . , n are coupled to receive sum and carry values from a prior carry-adder circuit in the series, The carry-adder circuit $802_n$ producers a carry value (or sum value) $s_n$ corresponding to an overflow. Each of the carry-adder circuits $802_j$ is associated with a corresponding inverse carry adder circuit $804_j$ and a sum circuit $806_j$.

Carry Look-Ahead Adders

In the ripple-carry adder, a carry $c_{i+1}$ is computed after the value of $c_i$ has been computed, and thus the overall depth of the circuit is in O(n). One protocol to reduce the depth is a ternary carry look-ahead adder, which can compute all carry trits in depth O(log n) by introducing extra O(n) ancillas.

Quantum ternary adders can take advantage of relations between $c_{i+1}$ and $c_i$, or more generally, between $c_i$ and $c_j$ for i≠j. For instance, if $a_i+b_i=2$, then $c_{i+1}=c_i$, i.e., the carry trit remains unchanged. If $a_i+b_i=1$, then $c_{i+1}=0$ regardless of the value of $c_i$, Relationships between carry trits and $a_i, b_i$ are summarized in FIG. 9. Note that $c_0=0$ and thus when i=0, the column $c_{i+}=c_i$ in FIG. 9 becomes $c_1=c_0=0$. For 0≤i<j≤n, a carry status indicator C[i, j] is defined as:

0, for all $c_j=0$
1, for all $c_j=1$
2, for all $c_i=c_j$
$c_j$, for i=0

Carry Status Indicators C[i, j]

FIG. 10 illustrates a representative carry status circuit 1000 (AdjC) that determines carry status indicators C[i,i+1] for adjacent trits $a_i, b_{i+1}$. The carry-status circuit 1000 includes a SWAP gate 1002, a SUM gate 1004, and a one trit swap gate 1006; a carry value is output on a qutrit associated with an input trit value $b_i$. The carry-status circuit includes one non-Clifford gate $S_{00,22}$ and no ancilla.

To compute C[0,1], one ancilla, and two non-Clifford gates $S_{00,22}$ and C(X) are needed. FIG. 11 illustrates a representative circuit 1100 (AdjC$_0$) that calculates C[0,1] and that includes a two trit swap gate $S_{00,22}$ 1102, sum gates 1104, 1106, and SWAP gates 1108, 1110. In this example, C[0,1] is available on the qutrit associated with a summand b.

Figures 12, 13:
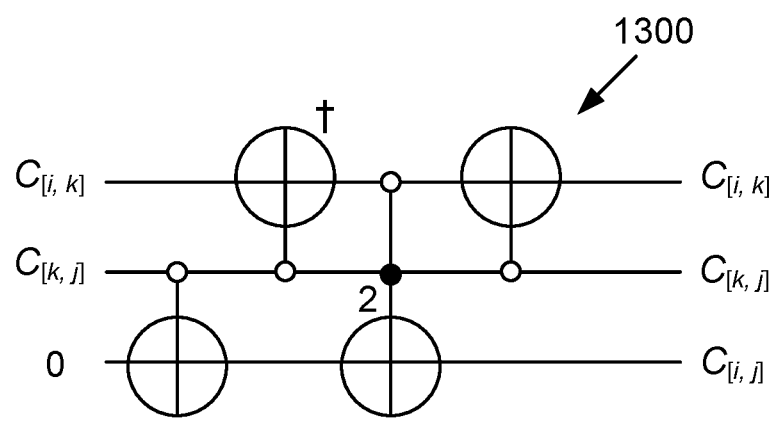
FIG. 12 illustrates a merging operation for carry status indicators.
FIG. 13 is a schematic diagram illustrating a quantum merging circuit that determines carry status indicators C[i,j] based on carry status indicators C[i,k],C[k,j], wherein i, j, k are non-negative integers.

After computing the carry status indicators for any two adjacent indices, C[i,j] can be computed for arbitrary i≠j. For 0≤i<k<j≤n, C[i,j] can be obtained from C[i,k] and C[k,j] by a merging formula illustrated in FIG. 12. A representative merging circuit 1300 that implements this formula is illustrated in FIG. 13. Because AdjC and AdjC$_0$ depend only on $a_i, b_i$, all the C[i,i+1] can be obtained in one time slice.

Carry-forward computation can be described as follows. For i=0, 1, . . . , n−1 let $B_i$ be a working register configured to be C[i,i+1] at the beginning, and let $Z_{i+1}$ be the working registers initialized to $|0\rangle$ and which are used to store C[i,i+1]. n−ω(n)−⌊log n⌋ ancillas $X_i$ initialized to $|0\rangle$ are used. Three processes, namely, a P-process, a C-process, and a $P^{-1}$-process are used. Each process roughly contains ⌊log n⌋ rounds. In a P-process, all the carry status indicators of the form $C[2^t m, 2^t(m+1)]$ are computed and the results stored in the ancillas, except carry status indicators of the form $C[0, 2^k]$ which are written to $Z[2^k]$.

There are ⌊log n⌋ rounds, each t=1, . . . , ⌊log n⌋ corresponding to one round. In the $t^{th}$ round (referred to as a P[t]-round), the status indicators $C[2^t m, 2^t(m+1)]$ m= 0, . . . , $$\left\lfloor \frac{n}{2^t} - 1 \right\rfloor$$

are computed. By the merging formula, $C[2^t m, 2^t(m+1)]$ can be obtained from $C[2^{t-1}(2m), 2^{t-1}(2m+1)]$ and $[2^{t-1}(2m+1), 2^{t-1}(2m+2)]$ both of which have been computed in round P[t−1]. Moreover, the merging circuit producing $C[2^t m, 2^t(m+1)]$ for different m's in the P[t]-round takes different carry status indicators in a P[t−1]-round as input. Note that the P[1]-round requires the carry status indicators C[i,i+1]'s in the registers $B_i$. Therefore, in the P[t]-round, all the merging circuits computing $C[2^t m, 2^t(m+1)]$ can be made parallel, and their inputs only depend on the carry status indicators from the P[t−1]-round. Thus, the depth of the circuit in P-process is ⌊log n⌋, the number of ancillas needed is n−ω(n)−⌊log n⌋, and the complexity is n−ω(n).

In C-processes, C[0,j] is computed into the register $Z_j$, j=1, . . . , n. This is performed in $$\left\lfloor \log \frac{n}{3} \right\rfloor + 1$$

rounds. Note that the $C[0, 2^k]$'s have already been obtained in a P-process, and are located in the desired positions. For $$t = \left\lfloor \log \frac{n}{3} \right\rfloor, \ldots,$$

0, the C[t]-round consists of computing the carry status indicators $C[0, 2^t(2m+1)]$, m=1, . . . , $$\left\lfloor \frac{n}{2^{t+1}} - \frac{1}{2} \right\rfloor.$$

Again, by the merging formula, $C[0,2^t(2m+1)]$ is obtained from $C[0,2^{t+1}m]$ and $C[2^t(2m),2^t(2m+1)]$. By induction, $C[0,2^{t+1}m]$ has been obtained in earlier C-rounds if m is not a power of 2, and in the P[t+1+log m] round otherwise. Also $C[2^t(2m),2^t(2m+1)]$ has been computed in the P[t]-round. Therefore, all the merging circuits in a C[t]-round can be executed in parallel. These circuits depend on the carry status indicators in the P[t]-round and C[k]-rounds, k≥t+1. If m is a power of 2, then the corresponding merging circuit also depends on $C[0,2^{t+1}m]$ from the P[t+1+log m]-round. Thus, the circuit in C-process has a depth of $$\left\lfloor \log \frac{n}{3} \right\rfloor + 1,$$

and the complexity is n−[log n]−1.

In a $P^{-1}$-process, the ancillas are set back to $|0\rangle$ and thus all the merging circuits in P-processes are reversed, except for those computing $C[0,2^k]$'s which are not stored in the ancillas. The $P^{-1}$-process consists of ⌊log n⌋−1 rounds. For t=⌊log n⌋−1, . . . , 1, the $P^{-1}$[t]-round uncomputes $C[2^tm,2^t(m+1)]$, m=1, . . . , $$\left\lfloor \frac{n}{2^t} \right\rfloor - 1$$

by using an inverse of the merging circuit. Note that in this process, all the $C[0,2^k]$'s are not needed. The process has a depth of [log n]−1 and the complexity of the circuit is n−ω(n)−[log n].

Most parts of C-processes and $P^{-1}$ processes can be executed in parallel. All the inputs to the C[t]-round which are not of the form $C[0,2^m]$ only depend on C[k]-rounds, k≥t+1 and the P[t]-round. The inputs that are of the form $C[0,2^m]$ are computed in a P[m]-round, but they are used in a corresponding $P^{-1}$ process. The $P^{-1}$[t+2] round only depends on the outputs in P[t+1]-round and P[t+2]-round. Thus the C[t]-round and the $P^{-1}$[t+2]-round can be performed simultaneously.

Figure 14:
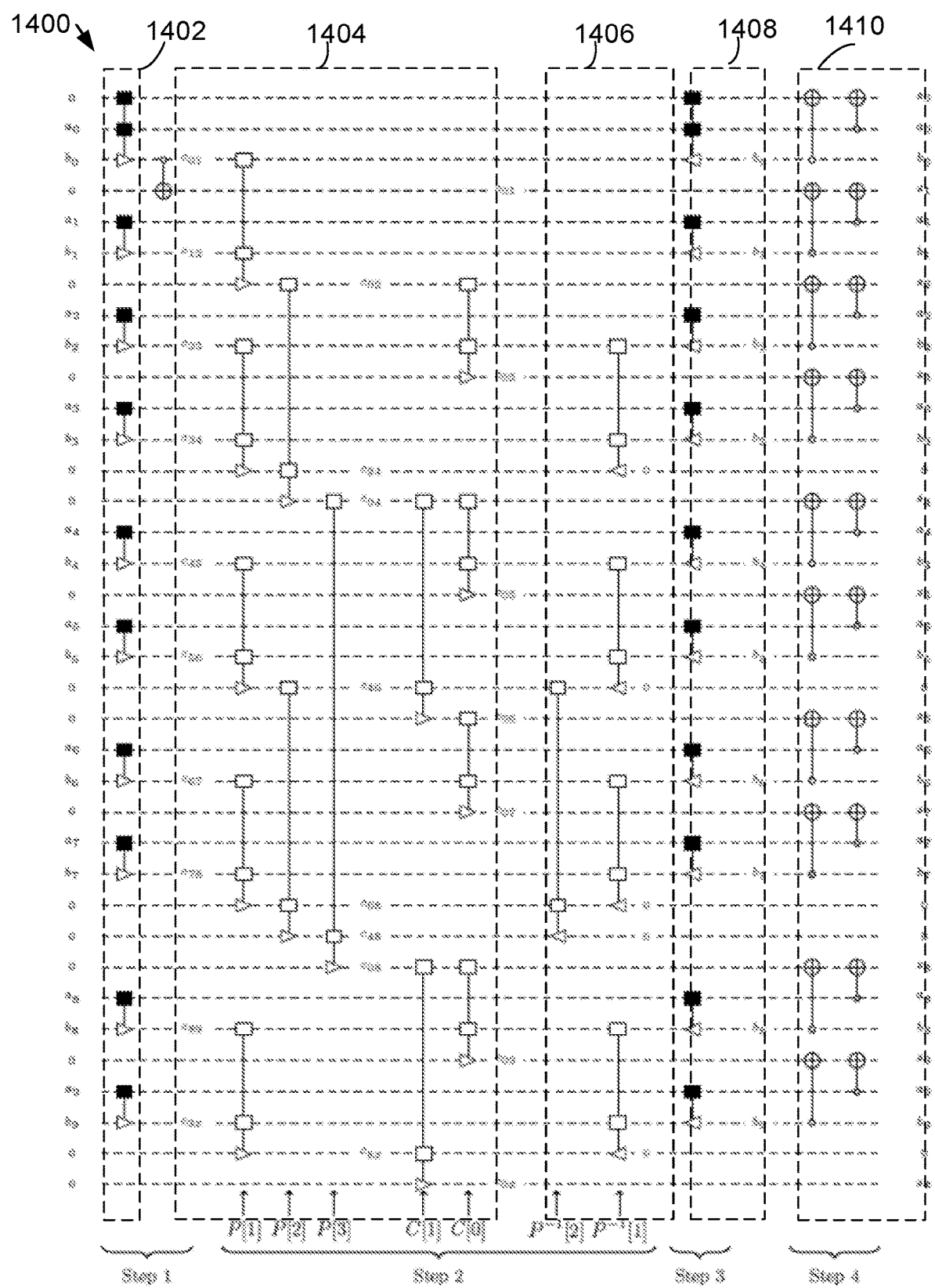
FIG. 14 is a schematic diagram of an "out of place" carry look-ahead quantum ternary addition circuit.

FIG. 14 illustrates an n-trit carry look-ahead ternary adder 1400 for n=10. A series 1402 of carry-status indicator circuits is coupled to respective qutrits $a_i,b_i$ of respective qutrit registers a, b that store summands a, b so as to produce carry-status indicators of the form C[i, i+1] on qutrits $b_i$. As shown in FIG. 14, the series includes circuits such as AdjC and $AdjC_0$ so that qutrits for all i values are processed. A series of merging circuits 1404 is coupled to produce additional carry-status indicators in three P-rounds and two C-rounds. As a result, carry values of the form $c_{0i}$ are communicated to qubits $s_i$ of an ancilla qutrit register s. (Ancilla qutrits are initialized as 0's as shown in FIG. 14). A series of inverse merging circuits 1406 and a series 1408 of inverse carry-status circuits are coupled to restore summand values in the $a_i,b_i$ qutrits and a series 1410 of addition circuits provides sums $s_i=a_i+b_i+c_{0i}$ for i=0, . . . , n. For n-qutrit registers, i=n is an overflow value, shown in FIG. 14 as $s_x$.

The example of FIG. 14 can be referred to as an "out-of-place" adder, as sum values are produced on ancilla qutrits.

Figure 15:
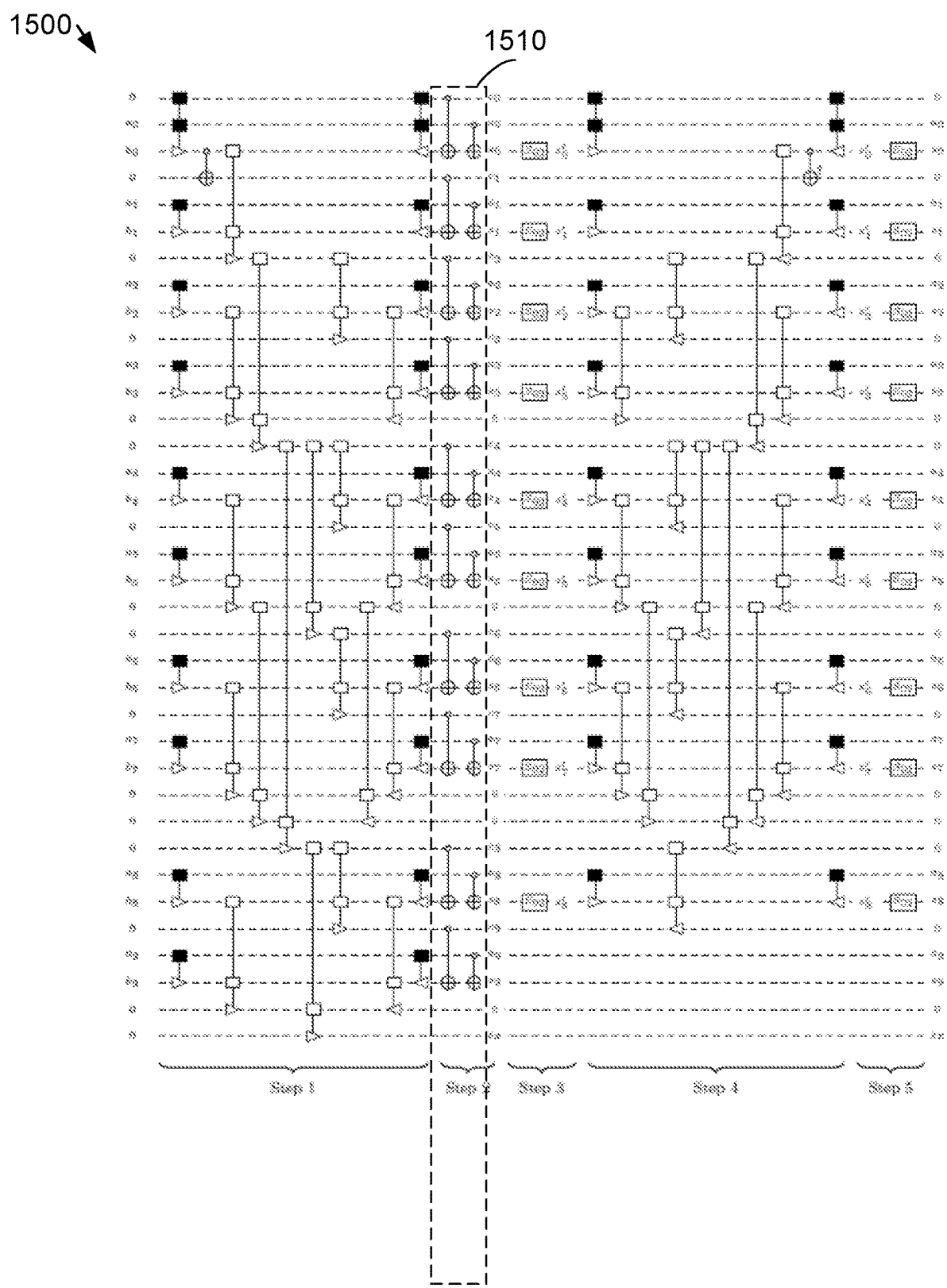
FIG. 15 is a schematic diagram of an "in-place" carry look-ahead quantum ternary addition circuit.
Figure 16A:
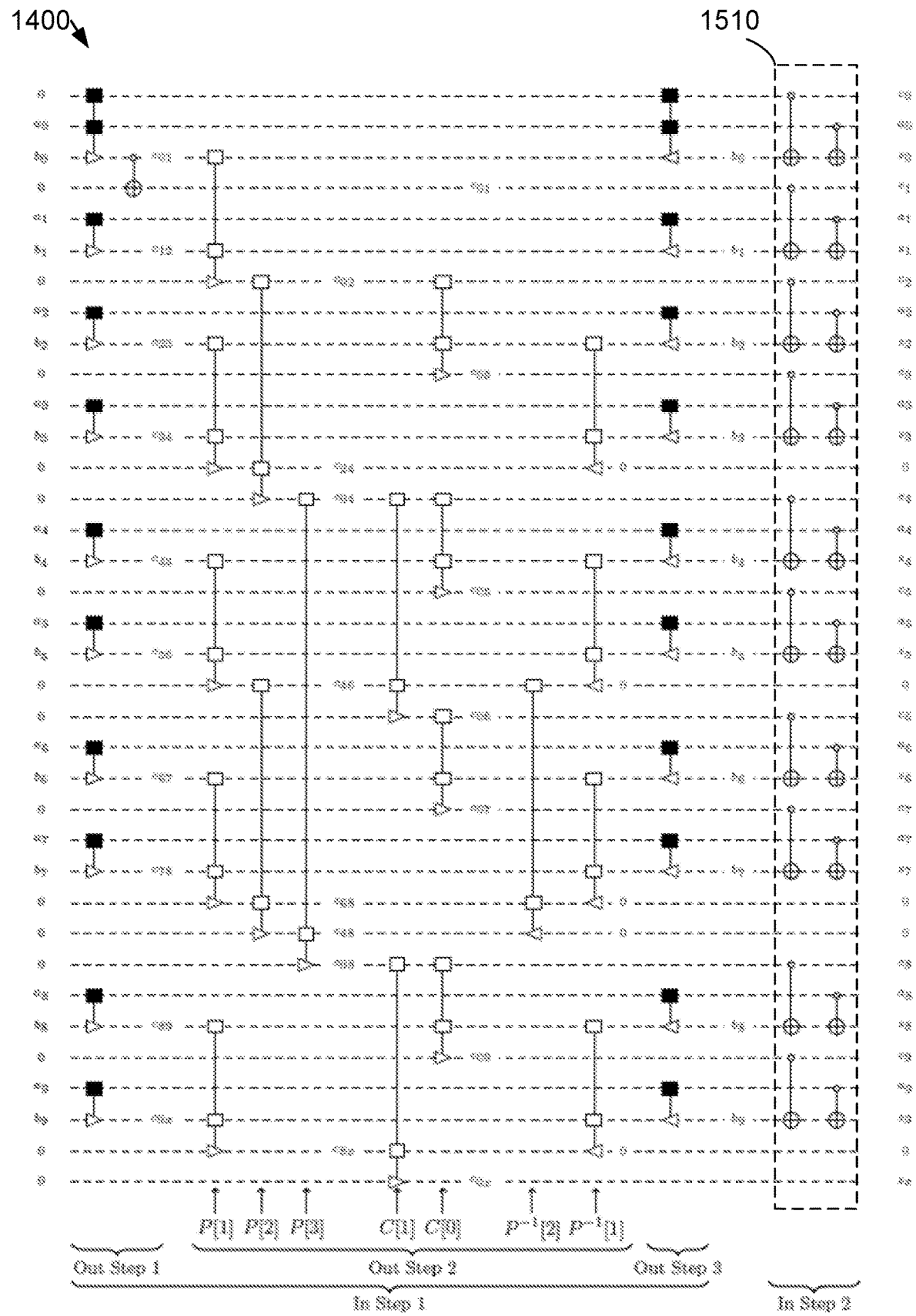
FIGS. 16A-16B are schematic diagrams of an "in-place" carry look-ahead quantum ternary addition circuit with comparison to a corresponding "out-of-place" circuit.
Figure 16B:
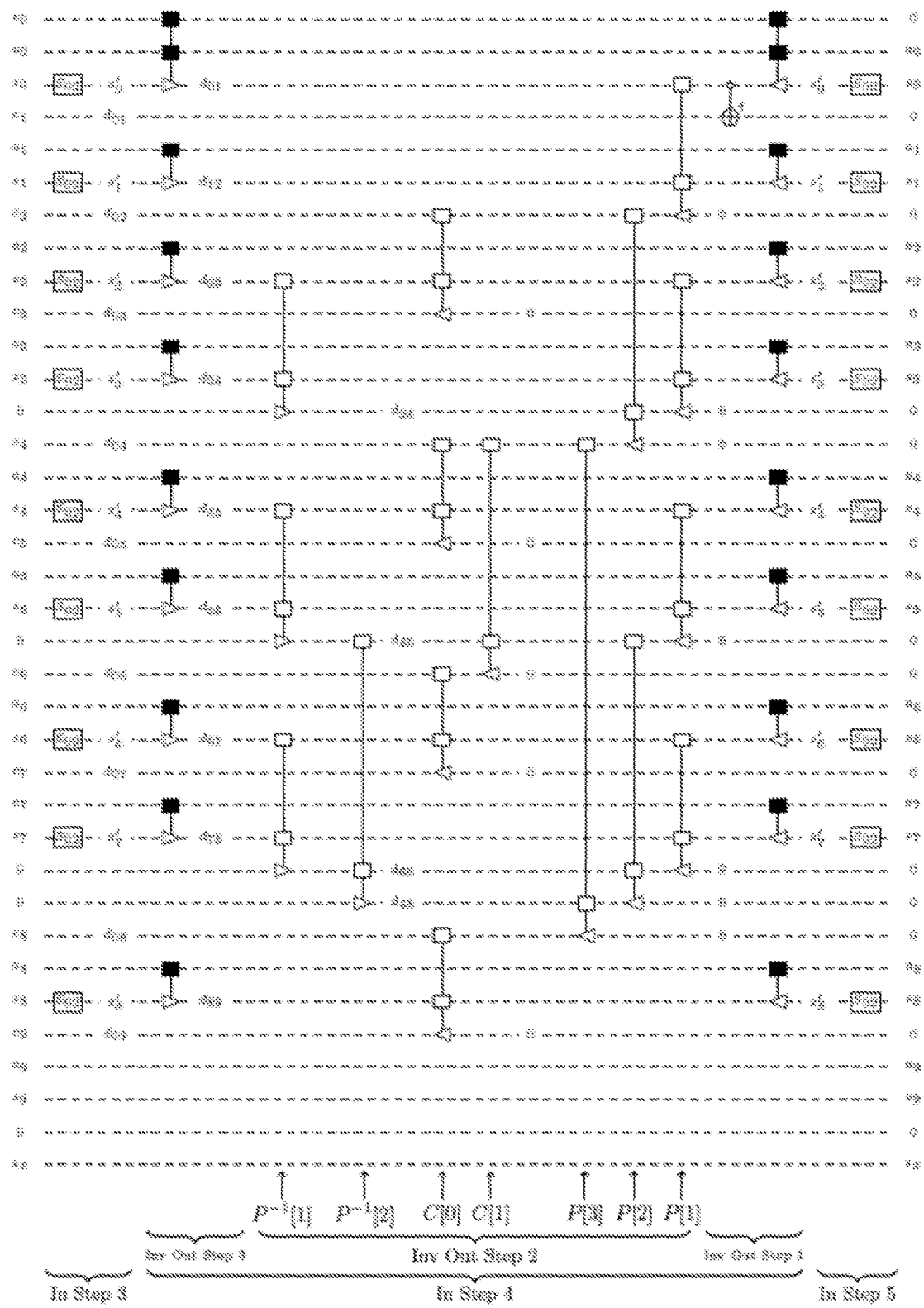

FIG. 15 illustrates another representative n-trit carry look-ahead ternary adder 1500 for n=10. The configuration of FIG. 15 is referred to as an "in-place adder" as the sum values appear on qutrits used to provide the input summands. In FIG. 15, the sum values appear in the b register. FIGS. 16A-16B are enlarged views of the circuit of FIG. 15 showing a comparison of processing with respect to the out of place adder (i.e., showing "In" steps and "Out steps"). In contrast to FIG. 14, a series 1510 of adders is coupled to produce sums in the b register.

Out-of-Place Procedure

An Out-of-Place procedure for ternary addition is described below in which input summands a, b are obtained from n-qutrit registers A, B and Z is an ancilla register. (1) For 0<i≤n−1, run the circuit AdjC on $A_i,B_i$ which outputs C[i,i+1] to $B_i$. Run $AdjC_0$ on $A_0,B_0$ and $Z_0$ with $Z_0$ as the ancilla, which outputs C[0,1] to $B_0$, C[0,1] is copied to $Z_1$ with the SUM gate. The circuit has a depth of 2, and it consist of n−1 AdjC circuits, one $AdjC_0$ circuit, and one SUM circuit. (2) Compute all the C[0,i]'s with the ancillas $X_i$'s and the merging circuit (and its inverse). At the end of this process, the ancillas are returned to 0, and $Z_i$=C[0,i], i=1, . . . , n. Note that $Z_1$=C[0,1] is obtained in a prior step. This requires 3n−2ω(n)−2⌊log n⌋−1 calls to the merging circuits, and has a circuit depth of $$\lfloor \log n \rfloor + \left\lfloor \log \frac{n}{3} + \right\rfloor 2. \quad (3)$$

Undo all the AdjC and $AdjC_0$ operations with corresponding inverse circuits to obtain $B_i=b_i,Z_i$=C[0,i]=$c_i$. The circuit has a depth of 2 and it consist of n−1 inverse AdjC circuits, one inverse $AdjC_0$ circuit, and one inverse SUM circuit. (4) Set $Z_i=Z_i \oplus A_i \oplus B_i$, 0≤i≤n−1. This requires 2n SUM gates.

In-Place Procedure

Let $\overline{2}$ be the n-trit number with all 2's, namely $\overline{2}=3^n-1$. For two n-trit numbers a,b denote by a⊕b as the number obtained by trit-wise summation modulo 3 and denote by a' the number obtained by replacing every trit $a_i$ by 2−$a_i$. Then, a⊕a'=$\overline{2}$, and a+a'=$3^n$−1. Let c=$c_0$ . . . $c_{n-1}$ be the sequence of the n low carry trits for a and b, and let s be the n low trits of a+b. Then, s=a+b (mod $3^n$) and s=a⊕b⊕c. Also note that:

$$s'+a=3^n-1-s+a=3^n-1-b=b' \pmod{3^n}.$$

Let d=$d_0$ . . . $d_{n-1}$ be the n low carry trits resulting from adding s' and a. Then s'⊕a⊕d=b', and $$\overline{2} \oplus a \oplus b \oplus d = s \oplus s' \oplus a \oplus b \oplus d = s \oplus b' \oplus b = \overline{2} \oplus a \oplus b \oplus c.$$

Therefore, c=d, i.e., the n low carry trits for a, b are the same as those for s', a. This can be used to implement an in-place adder. For 0≤i≤n−1 let $A_i,B_i$ be the working registers initialized with $a_i,b_i$ respectively. 2n−ω(n)−[log n] ancillas are used, n of which are denoted $Z_0,Z_1,\ldots,Z_{n-1}$ and the rest are $X_i$'s. Let $Z_n$ be the working register which will store the high trit of a+b. All ancillas start with 0.

As described with reference to the Out-of-place Procedure steps (1)-(3), compute all carry trits C[0, j] into $Z_j$, j=0, . . . ,n. The ancillas $X_i$ and working registers $A_i,B_i$ are all returned to their initial configuration at the end of the process. This has a circuit depth of $$\lfloor \log n \rfloor + \left\lfloor \log \frac{n}{3} \right\rfloor + 6,$$

with complexity of $5n-2\omega(n)-2\lfloor \log n \rfloor+1$. (2) For $0 \leq i \leq n-1$, let $B_i = B_i \oplus A_i \oplus Z_i$ so that the register $B_i$'s store the n low trits of the sum. (3) Next, erase the n carry trits $C[0,i] = c_i$, $i = 0, \ldots, n-1$. For $0 \leq i \leq n-2$, let $B_i = 2 - B_i$ with $n-1$ $S_{0,2}$ gates. (4) Apply the inverse of the Out-of-place Procedure, Steps 1-3 on the $A_i, B_i$'s for $0 \leq i \leq n-2$ to erase the carry trits $c_j$ stored in $Z_j$, $j=0, \ldots, n-1$. For $0 \leq i \leq n-2$ let $B_i = 2 - B_i$. This can be done by $n-1$ $S_{0,2}$ gates.

Example. Quantum Ternary Subtraction

Figure 17:
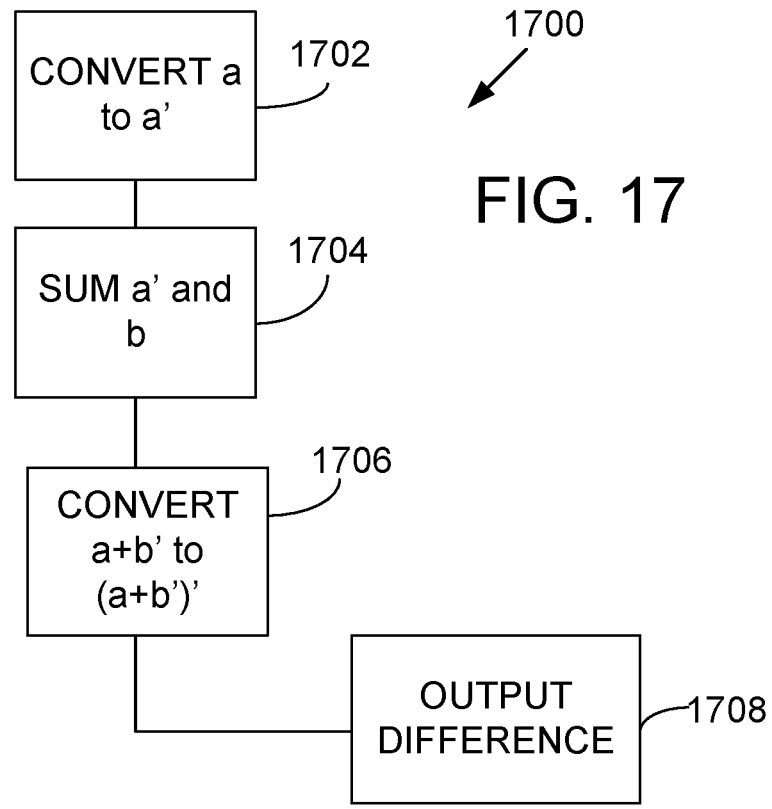
FIG. 17 is a schematic diagram of a quantum circuit that provides addition modulo $3^n$.

With quantum ternary addition circuits such as disclosed above, quantum ternary subtraction can also be carried out. Referring to FIG. 17, a method 1700 of subtraction of two n-trit numbers a,b includes converting a to a' at 1702 by replacing each $a_i$ with $2-a_i$, i.e., $a'=3^n-a-1$. At 1704, a sum $a'+b$ is obtained. At 1706, this sum is converted as follows to produce the difference:

$$(a'+b)'=(3^n-1-a-b)'=3^n-1-(3^n-1-a-b)=a-b.$$

This difference is output at 1708.

Figure 18:
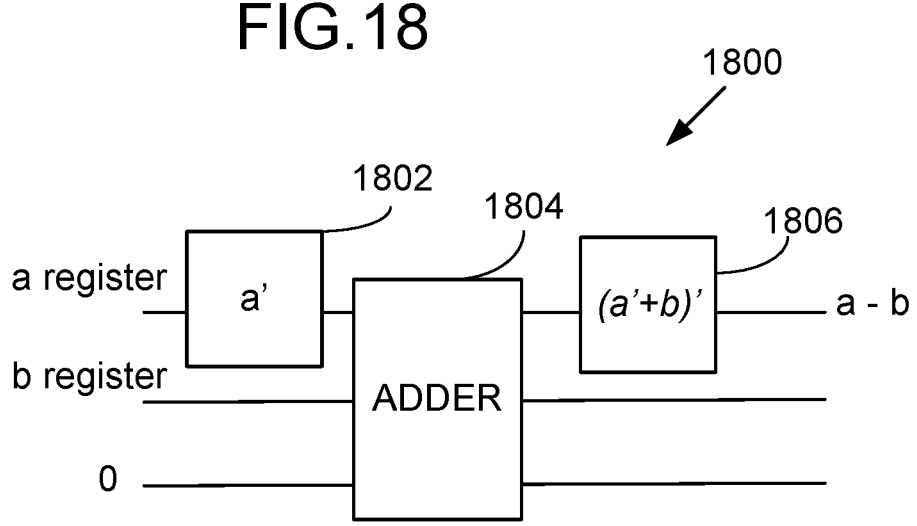
FIG. 18 is a schematic diagram illustrating a representative quantum method of ternary subtraction.

A representative quantum ternary subtraction circuit 1800 is illustrated in FIG. 18. An a register storing a ternary a value is coupled to a conversion circuit 1802 that produces an output $a'=3^n-a-1$. This output and a ternary value from a b register are coupled to an adder 1804 to produce an output $a'+b$ that is coupled to a conversion circuit to produce the difference. As shown in FIG. 18, the a register is used to store the sum $a'+b$, but the b register or an ancilla register can be used instead.

Example. Quantum Ternary Comparison

Figure 19:
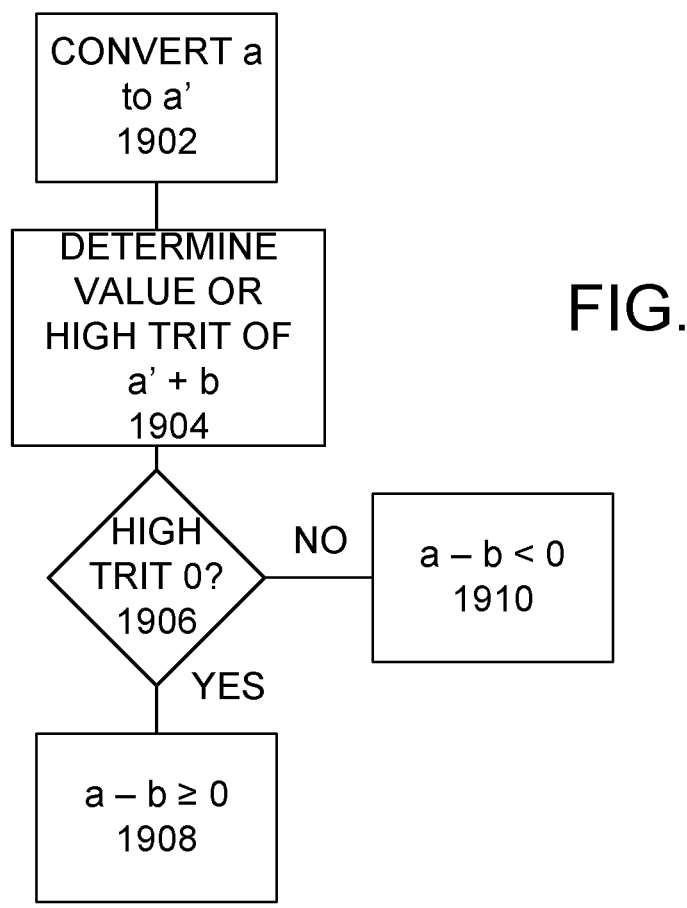
FIG. 19 is a schematic diagram illustrating a representative quantum ternary comparator.

A comparison of two ternary numbers a, b can be determined using ternary subtraction as discussed above, but a comparison can also be obtained with less complexity as only a high (most significant) trit value of a−b is needed. Referring to FIG. 19, a comparison method 1900 includes converting a ternary value a to $a'=3^n-a-1$ at 1902. At 1904, value of a most significant (high) trit value of a sum $a'+b$ is determined. At 1906, if this trit value is 0, then difference $a-b \geq 0$ as output at 1908; otherwise, $a-b < 0$ as output at 1910.

In the carry look-ahead adder, again a is first converted to a'. To compute a sum $a'+b$ the circuit sequentially generates all the carry status indicators. However, since only a high trit $c_n = C[0,n]$ is needed, a more efficient circuit can be used to implement the comparison.

As discussed above, in a P-process, all the carry status indicators of the form $C[2^r m, 2^r(m+1)]$, and in particular, any $C[0,2^k]$ are obtained. If $n=2^k$ for some k then $c_n$ is obtained at the end of a P-process and there is no need to go through a C-process. Instead, $c_n$ is copied into the register storing the result, and the P-process is undone.

In general, let $k=\lceil \log n \rceil$; a and b are padded by adding zeros to make them $2^k$-trit numbers, and the circuit described above is used to compare a and b. For convenience, the padded numbers are referred to herein as a and b as well. For $0 \leq i \leq n-1$, let $A_i = a_i, B_i = b_i$ be the working registers, and let R be the register which will store the result of the comparison. $2^k + 2(2^k - n)$ ancillas are needed, among which $2(2^k - n)$ are used to hold the extra zeros in from of a and b, one is denoted by $Z_0$ as the ancilla to the $AdjC_0$ circuit, and the rest are denoted by $X_i$.

Note that after padding s a and b with zeros, the carry status indicators $C[i, j]$ for $n \leq i < j \leq 2^k$ are known before compilation, thus their values can be stored in the registers and there is no need to recompute them later.

Carry Look-Ahead Comparison

In a first step, convert a to a'. This requires $2^k S_{0,2}$ gates. In a second step, for $0 < i \leq n-1$, run the circuit AdjC on $A_i, B_i$ which outputs $C[i,i+1]$ to $B_i$. Run $AdjC_0$ on $A_0, B_0$ and $Z_0$ with $Z_0$ as the ancilla, which outputs $C[0,1]$ to $B_0$. The circuit has a depth of 2 and consists of n−1 AdjC circuits and one $AdjC_0$ circuit. Third, perform the P-process in discussed above to compute all $C[2^r m, 2^r(m+1)]$ that are not known before compilation into the ancillary registers $X_i$. Since the $Z_i$ registers are not available, all $C[0,2^m]$'s are also written to the $X_i$ registers. The depth of the circuit is k, and the complexity is $2^k - \omega(2^k) - (2^k - n - \omega(2^k - n)) = n + \omega(2^k - n) - 1$. Fourth, copy $c_{2^k}$ to the result register R. Fifth, undo steps 3, 2, and 1. Total depth of such a circuit is $2k+4=2\lceil \log n \rceil+4$ and it has the complexity of $4n+2\omega(2^k-n)=4n+2\omega(2^{\lceil \log n \rceil}-n)$. The number of ancillas used is $3 \cdot 2^{\lceil \log n \rceil}-2n$.

Example. Quantum Ternary Modular Addition

Figure 20:
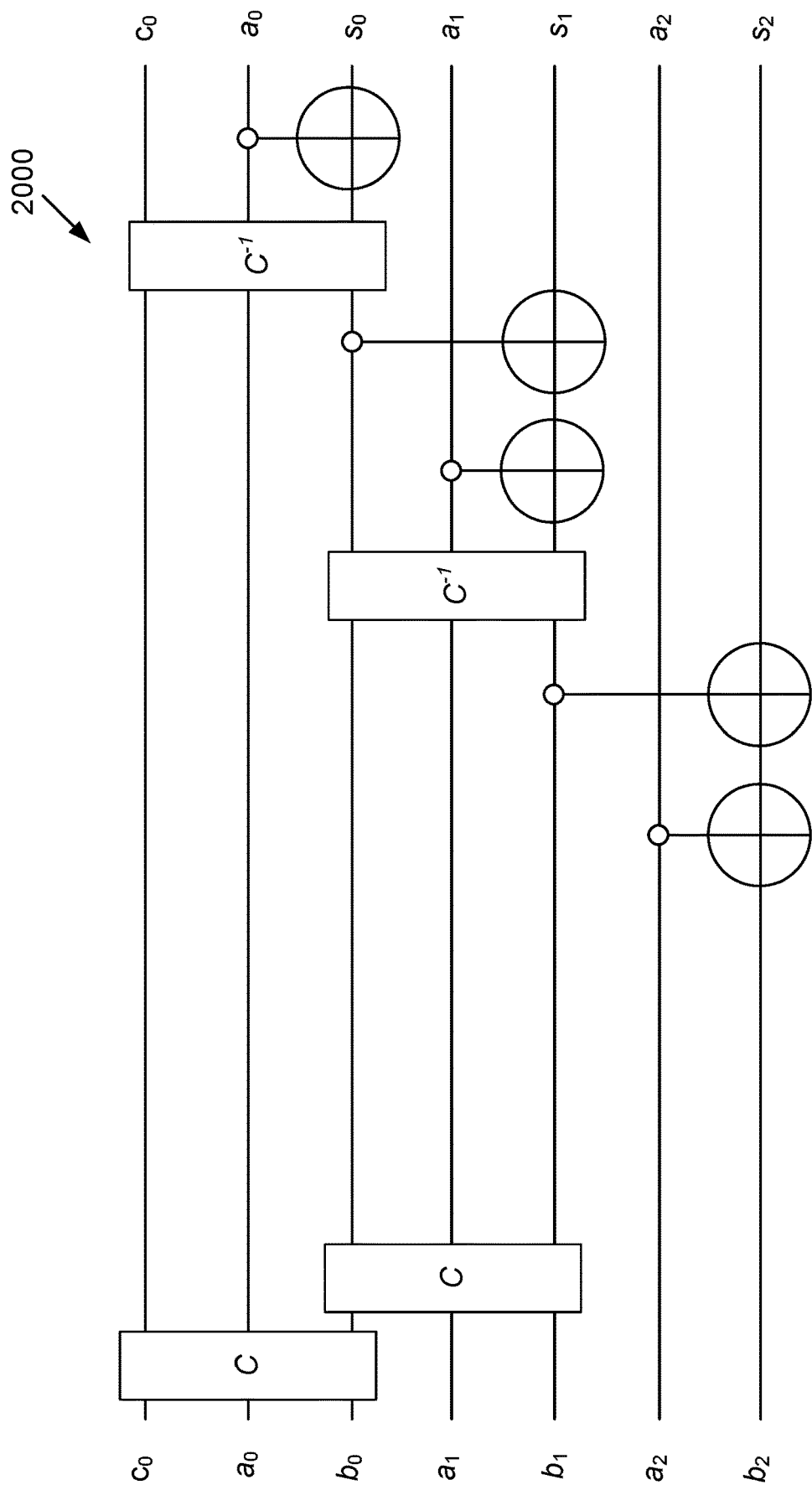
FIG. 20 illustrates a method of quantum ternary comparison.

Referring to FIG. 20, an modular addition circuit 2000 for 3-qutrit addition is similar to the circuit of FIG. 7 but a higher order sum trit (or overflow trit) need not be computed so the carry-adder circuits 716, the adder circuit 718, and the inverse carry-adder circuit 720 are not needed. In addition, the ancilla qutrit 720 used to store $s_3$ can be omitted. Modular addition circuits for other values of n are similar. Carry-save modular addition circuits are similar to the carry-save addition circuits of FIGS. 14-16B but only the low n−1 trits are needed, i.e., only $a_0, \ldots a_{n-2}, b_0, \ldots b_{n-2}$ are used as inputs.

Techniques of Constructing Quantum Gates

The methods and apparatus for quantum ternary arithmetic are described above with reference to two types of quantum ternary adders. The building blocks of these adder circuits include the Carry circuit C, the carry status circuits $AdjC, AdjC_0$ that compute carry status indicators, and the merging circuit M. The four non-Clifford gates used in these circuits are $S_{00,22}$, $C(S_{0,1})$, $C(X)$, $C(SUM)$. It suffices to have $O(X)$ along with the Clifford gates to produce the other three non-Clifford gates exactly. Algebraic expressions of these gates can be used. As shown below, $O(X)$ and the Horner gate are equivalent up to Clifford gates, and that all other non-Clifford gates can be obtained from $O(X)$.

A universal gate set defined below is referred to as a supermetaplectic basis, which is a qutrit analog of the qubit Clifford+T gate set. It is also shown that $O(X)$ and the Horner gate can both be implemented exactly over the supermetaplectic basis. Therefore, with the supermetaplectic basis, ternary circuits for arithmetic can be realized exactly.

Construction of Reversible Gates Using Polynomial Expressions

Let $F_3$ be the field with three elements $\{0,1,2\}$. Then any n-qutrit reversible gate can be represented as a map $F_3^n \mapsto F_3^n$ or a sequence of n functions $F_3^n \mapsto F_3$ if each $|i\rangle$ is identified with 0, 1, 2. Reversible gates have polynomial representations and these polynomial representations can be used to construct one reversible gate from another. Note that $0^2=0, 1^2=2^2=1$ mod 3, and thus $\delta_{i,0}=1-i^2$ mod 3. By default, arithmetic within a ket is taken modulo 3. The following is a list of polynomial expressions associated with some non-Clifford gates.

$$\text{SUM}=\vee(X): |i,j\rangle \mapsto |i,i+j\rangle \qquad \text{(soft control)}$$

$$C_0(X): |i,j\rangle \mapsto |i, j+\delta_{i,0}\rangle = |i, j-i^2+1\rangle \qquad \text{(hard control)}$$

$$\text{Horner} := \Lambda(\Lambda(X)): |i,j,k\rangle \mapsto |i,j,ij+k\rangle \quad \text{(soft control)}$$

$$C_0(\text{SUM}): |i,j,k\rangle \mapsto |i,j,k+(1-i^2)j\rangle \quad \text{(hard control)}$$

As shown above, if a qutrit works as a soft control, then it contributes a linear factor in the expression of the target qutrit, while a hard control qutrit contributes a quadratic factor. Define $C'(X): |i,j\rangle \mapsto |i,j\rangle + i^2$ so that $C'(X) = (I \otimes X)C_0(X)^{-1}$ is equivalent to $C(X)$. $C'(X)$ is used below for the construction of other gates.

Figure 21:
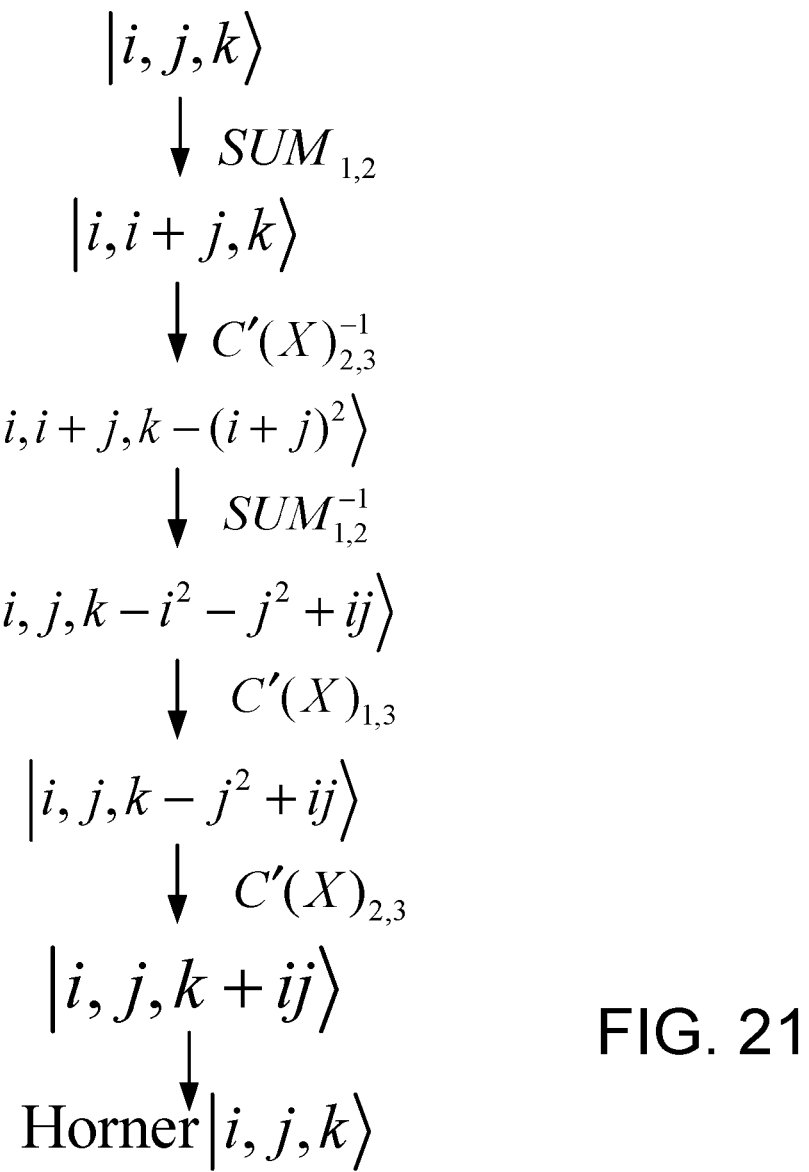
FIGS. 21-22 give constructions of the Horner gate and $C'(X)$ from one another.
Figure 22:
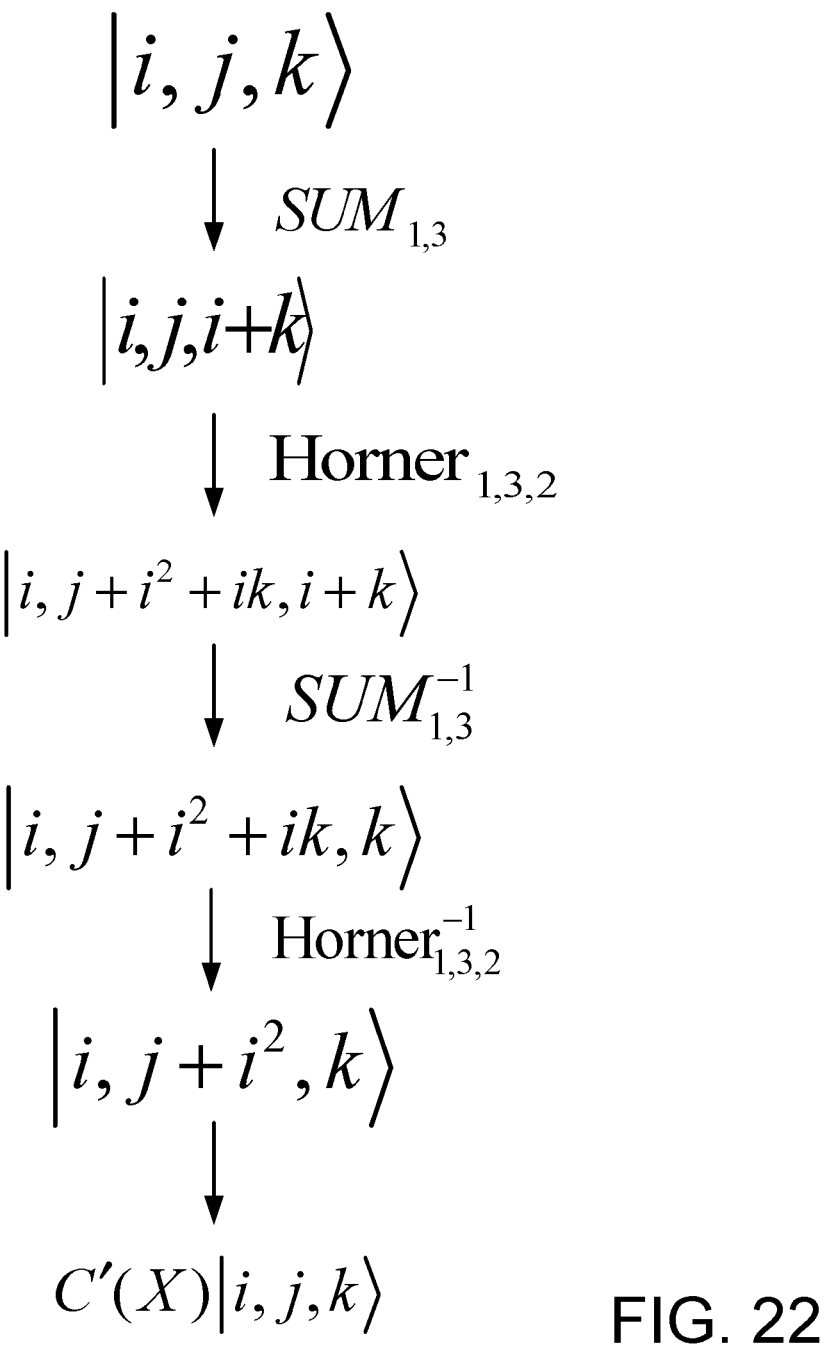
Figure 23:
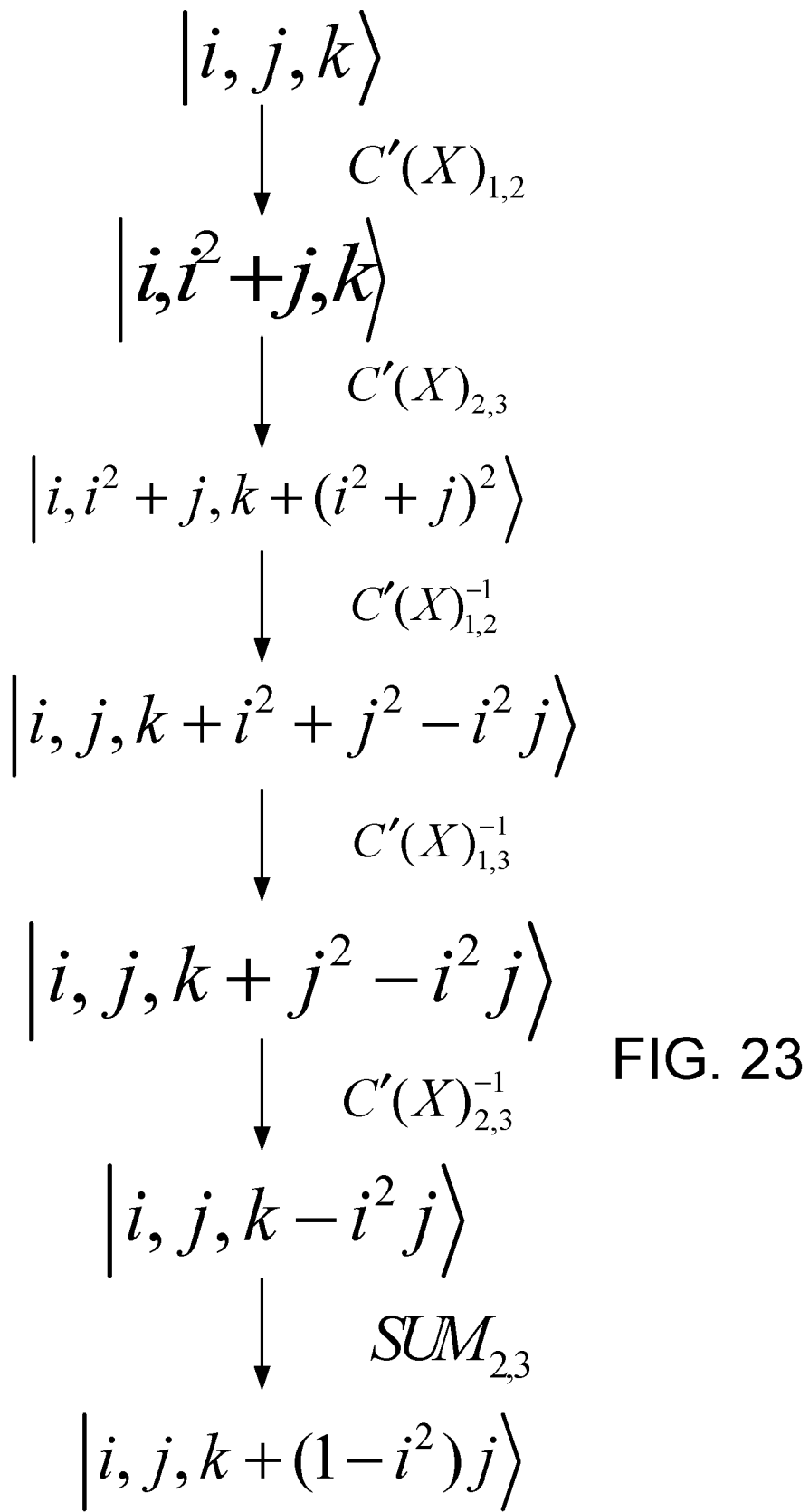
FIG. 23 shows a construction of C(SUM) from $C'(X)$.

The relation between the expressions of the Horner gate and $C'(X)$ resembles that of a bilinear form and a quadratic form, which are equivalent. This suggests that these gates are equivalent. FIGS. 21-22 give constructions of the Horner gate and $C'(X)$ from one another. FIG. 23 shows a construction of $C(\text{SUM})$ from $C'(X)$.

$C(S_{0,1})$ and $S_{00,22}$ can be similarly implemented. Note that the circuit of FIG. 24 shows an implementation of $S_{01,10}$. In addition, $$S_{00,22} = \text{SUM}^{-1}(X^{-1} \otimes I)S_{01,10}(X \otimes I)\text{SUM}.$$

$$C_0(S_{0,1}) = \text{SUM}_{2,1}^{-1}(X^{-1} \otimes X^{-1})S_{00,22}(X \otimes X)\text{SUM}_{2,1}.$$

Supermetaplectic Basis

Recall that $\mathbb{C}$ is the qutrit Clifford group generated H, Q, X and SUM. Some other gates in $\mathbb{C}$ are Z and $\sqrt{}(Z)$, wherein $Z = \text{diag}(1, \zeta_3, \zeta_3^2)$ and $\sqrt{}(Z) = (I \otimes H)\text{SUM}(I \otimes H^{-1})$. It can be directly confirmed that $\sqrt{}(Z)$ can be expressed as:

$$\sqrt{}(Z): |i,j\rangle \mapsto \zeta_3^{ij}|i,j\rangle$$

The metaplectic basis is defined as a universal qutrit gate set $\mathbb{C} + \text{diag}(1,1,-1)$ or equivalently $\mathbb{C} + \text{diag}(1, \zeta_6, \zeta_6^2)$. In spite of its universality, it is unlikely that all the reversible gates can be implemented exactly over the metaplectic basis. To provide superior exact implementations, the order of the root of unity used in defining the non-Clifford diagonal gate is increased, and $P_9$ is defined as 1-qutrit diagonal gate $\text{diag}(1, \zeta_9, \zeta_9^2)$. The supermetaplectic gate set is then defined to be the universal gate set $\mathbb{C} + P_9$. All reversible gates can be constructed exactly over the supermetaplectic gate set.

Construction of Diagonal Gates Using Polynomial Expressions

Polynomial expressions can be used in constructing new quantum gates in the supermetaplectic basis. Let D be the group generated by the reversible gates in $\mathbb{C}$ together with the diagonal gates $\sqrt{}(Z)$ and $P_9$.

The group of reversible gates in $\mathbb{C}$ is generated by SUM, X, $S_{1,2}$. It can be shown that the set {SUM, X, $S_{1,2}$} generates a maximal subgroup, which is isomorphic to $\simeq GL(n, F_3) \ltimes F_3^n$, of the group of reversible gates (the permutation group) for any number n of qutrits.

A function $f: F_3^n \mapsto F_3$ is called affine linear if $f(i_1, \ldots, i_n) = a_1 i_1 + \ldots + a_n i_n + b$, wherein $a_1, \ldots, a_n, b \in F_3$. Let $F_n$ be the set of all affine linear functions from $F_3^n$ to $F_3$. Note that generators of D have the following algebraic expressions:

$$\sqrt{}(Z)|i,j\rangle = \zeta_3^{ij}|i,j\rangle, P_9|i\rangle = \zeta_9^i|i\rangle$$

$$X|i\rangle = |i+1\rangle, S_{1,2}|i\rangle = |2i\rangle, \text{SUM}|i,j\rangle = |i,i+j\rangle$$

The reversible gates $X, S_{1,2}$ and SUM all have affine linear expressions. Any reversible gate with affine linear expressions can be expressed in terms of $\{S_{1,2}, X\}$ and SUM. Therefore, the most general n-qutrit diagonal gate in D has the form:

$$|i_2, \ldots, i_n\rangle \mapsto$$

$$\zeta_9^{\sum_{f \in \mathcal{F}_n} A_f f(i_1, \ldots, i_n)} \zeta_3^{\sum_{f,g \in \mathcal{F}_n} B_{f,g} f(i_1, \ldots, i_n) g(i_1, \ldots, i_n)} |i_2, \ldots, i_n\rangle$$

wherein $A_f, B_{f,g}$ are integers.

As a representative example, $\sqrt{}(\sqrt{}(Z))$ and $C_2(Z)$ are shown to be contained in D.

$$\sqrt{}(\sqrt{}(Z)): |i,j,k\rangle \mapsto \zeta_3^{ijk}|i,j,k\rangle$$

$$C: |i,j\rangle \mapsto 2|\zeta_3^{j\delta_{i2}}\rangle|i,j\rangle$$

For n=3, the general expression above for an n-qutrit diagonal gates D can be written as:

$$L(i, j, k) = \zeta_9^{\sum_{a,b,c,d=0}^{2} A_{a,b,c,d}(ai+bj+ck+d)} \zeta_3^{Bij+Cjk+Dik},$$

$i,j,k \in F_3$, wherein $A_{a,b,c,d}, B, C, D$ are integer parameters.

To construct $\sqrt{}(\sqrt{}(Z))$, set $L(i,j,k) = \zeta_3^{ijk}$. Since $\zeta_9 = \zeta_3^3$, then the following equation is obtained:

$$Equ(i, j, k): \sum_{a,b,c,d} A_{a,b,c,d}(ai+bj+ck+d) + 3(Bij+Cjk+Dik) =$$

$$3ijk \pmod{9},$$

$i,j,k \in F_3$ Equ(i,j,k) is a system of 27 linear equations in the variables $A_{a,b,c,d}, B, C, D$ and can be solved for these variables. By direct calculation, one solution to the above system of equations is:

$$\zeta_3^{ijk} = \zeta_9^{(1+2i+j+k)+2(1+2i+j+2k)+6(2+2i+j+2k)+2(1+2i+2j+k)+6(2+2i+2j+k)+4(1+2i+2j+2k)+6(2+2i+2j+2k)}$$

Based on the above, a circuit realizing $\sqrt{}(\sqrt{}(Z))$ can be obtained as shown in FIG. 25. FIG. 26 illustrates a circuit for $C_2(Z)$ that can be found in a similar manner.

Note that $\sqrt{}(\sqrt{}(Z))$ and $C_2(Z)$ are related to the Horner gate and $C_2(X)$, respectively, by the Clifford gate H, namely:

$$(I \otimes H)C_2(X)(I \otimes H^+) = C_2(Z)$$

$$(I \otimes I \otimes H)\text{Horner}(I \otimes I \otimes H^+) = \sqrt{}(\sqrt{}(Z))$$

Therefore, both of these gates can be implemented exactly over the supermetaplectic basis.

Quantum and Classical Processing Environments

Figure 27:
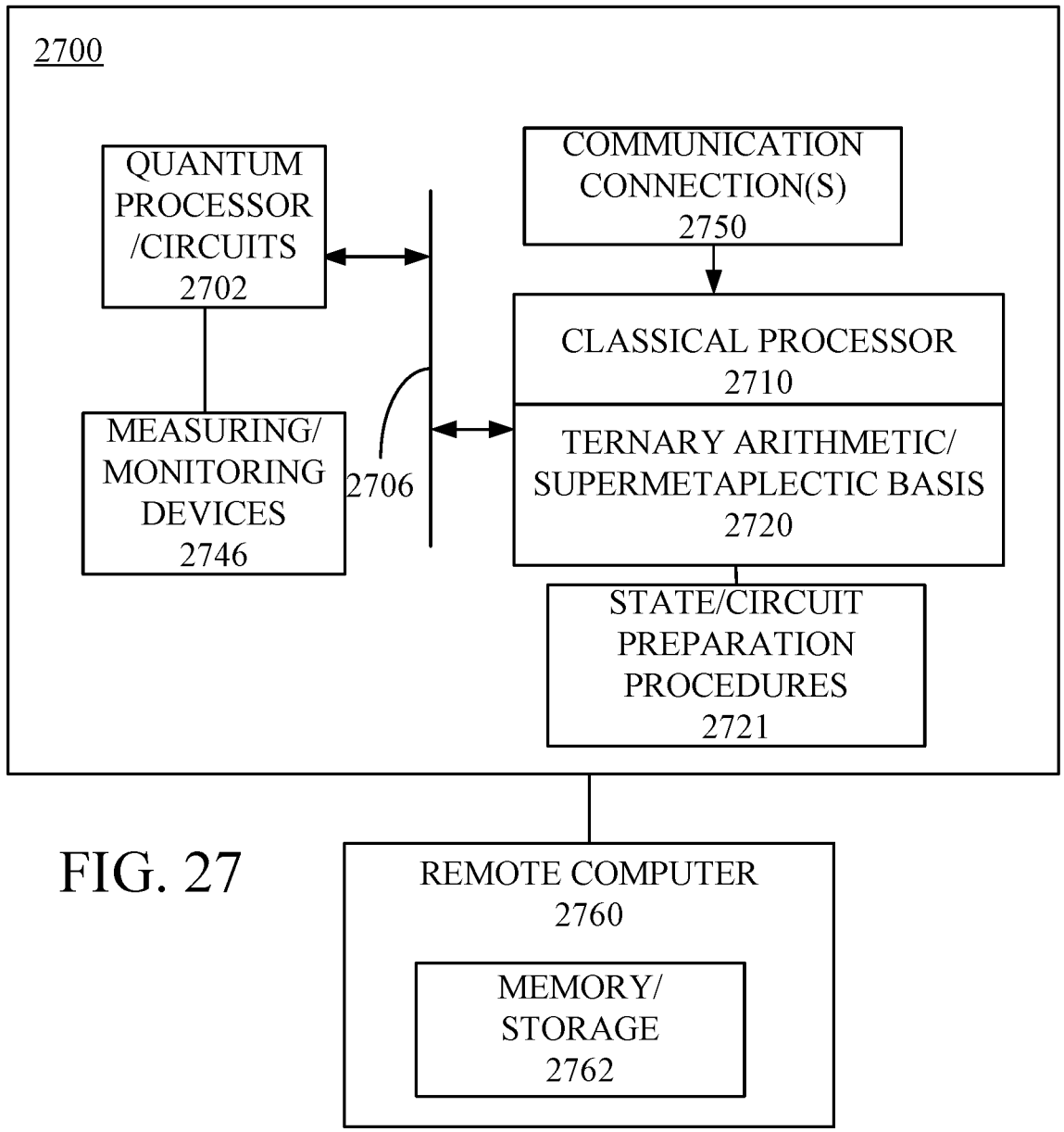
FIG. 27 illustrates a representative classical computer that is configured to synthesize circuits for quantum ternary arithmetic and a quantum computing environment in which such circuits are implemented.

With reference to FIG. 27, an exemplary system for implementing some aspects of the disclosed technology includes a computing environment 2700 that includes a quantum processing unit 2702 and one or more monitoring/measuring device(s) 2746. The quantum processor executes quantum circuits (such as the circuit ternary arithmetic circuits described above) that can be precompiled by classical compiler unit 2720 utilizing one or more classical processor(s) 2710.

With reference to FIG. 27, the compilation is the process of translation of a high-level description of a quantum algorithm into a sequence of quantum circuits. Such high-level description may be stored, as the case may be, on one or more external computer(s) 2760 outside the computing environment 2700 utilizing one or more memory and/or storage device(s) 2762, then downloaded as necessary into the computing environment 2700 via one or more communication connection(s) 2750. Alternatively, the classical compiler unit 2720 is coupled to a classical processor 2710 and a procedure library 2721 that contains some or all procedures or data necessary to implement the methods and circuits described above such as merging circuits, modular addition, comparison, and other ternary computations.

Figure 28:
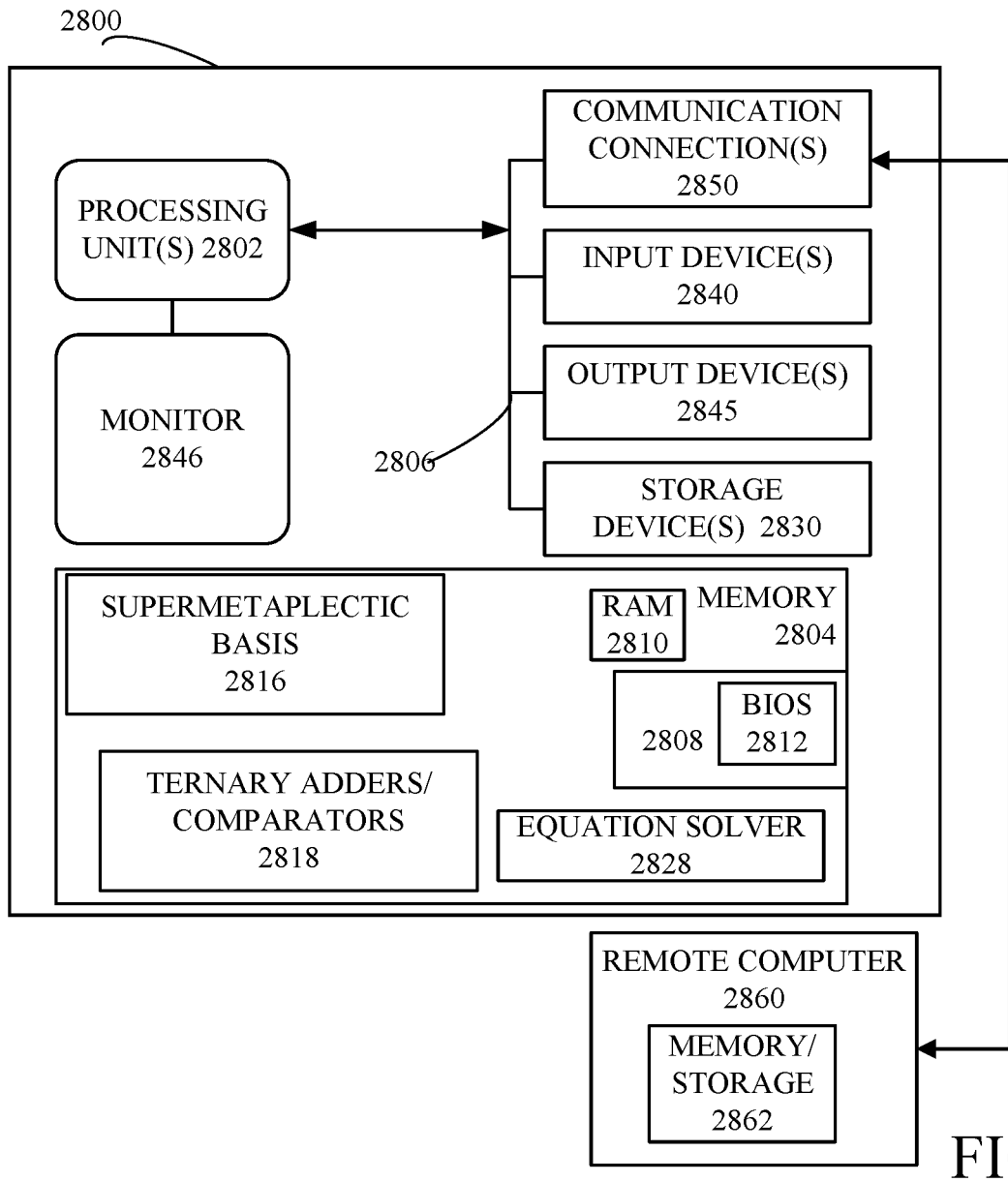
FIG. 28 is a block diagram of a representative classical computing environment.

FIG. 28 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

Typically, a classical computing environment is coupled to a quantum computing environment, but a quantum computing environment is not shown in FIG. 28.

With reference to FIG. 28, an exemplary system for implementing the disclosed technology includes a general purpose computing device in the form of an exemplary conventional PC 2800, including one or more processing units 2802, a system memory 2804, and a system bus 2806 that couples various system components including the system memory 2804 to the one or more processing units 2802. The system bus 2806 may be any of several types of bus structures including a memory bus or memory controller, a peripheral bus, and a local bus using any of a variety of bus architectures. The exemplary system memory 2804 includes read only memory (ROM) 2808 and random access memory (RAM) 2810. A basic input/output system (BIOS) 2812, containing the basic routines that help with the transfer of information between elements within the PC 2800, is stored in ROM 2808.

As shown in FIG. 28, a specification of a supermetaplectic basis and procedures for synthesis using this based are stored in a memory portion 2816. Instructions for specifying ternary arithmetic circuits are stored at 2818. Processor-executable instructions for solving equations that specify supermetaplectic basis specifications are stored at 2828.

The exemplary PC 2800 further includes one or more storage devices 2830 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 2806 by a hard disk drive interface, a magnetic disk drive interface, and an optical drive interface, respectively. The drives and their associated computer readable media provide nonvolatile storage of computer-readable instructions, data structures, program modules, and other data for the PC 2800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 2830 including an operating system, one or more application programs, other program modules, and program data. Storage of circuit designs, and computer-executable instructions for circuit synthesis and configuring a quantum computer based on such circuits can be stored in the storage devices 2830 as well as or in addition to the memory 2804. A user may enter commands and information into the PC 2800 through one or more input devices 2840 such as a keyboard and a pointing device such as a mouse. Other input devices may include a digital camera, microphone, joystick, game pad, satellite dish, scanner, or the like. These and other input devices are often connected to the one or more processing units 2802 through a serial port interface that is coupled to the system bus 2806, but may be connected by other interfaces such as a parallel port, game port, or universal serial bus (USB). A monitor 2846 or other type of display device is also connected to the system bus 2806 via an interface, such as a video adapter. Other peripheral output devices 2845, such as speakers and printers (not shown), may be included. In some cases, a user interface is displayed so that a user can input user preferences regarding circuit implementations.

The PC 2800 may operate in a networked environment using logical connections to one or more remote computers, such as a remote computer 2860. In some examples, one or more network or communication connections 2850 are included. The remote computer 2860 may be another PC, a server, a router, a network PC, or a peer device or other common network node, and typically includes many or all of the elements described above relative to the PC 2800, although only a memory storage device 2862 has been illustrated in FIG. 28. The storage device 2862 can provide storage of ternary circuit specifications and supermetaplectic basis synthesis procedures. The personal computer 2800 and/or the remote computer 2860 can be connected to a logical a local area network (LAN) and a wide area network (WAN). Such networking environments are commonplace in offices, enterprise wide computer networks, intranets, and the Internet.

When used in a LAN networking environment, the PC 2800 is connected to the LAN through a network interface. When used in a WAN networking environment, the PC 2800 typically includes a modem or other means for establishing communications over the WAN, such as the Internet. In a networked environment, program modules depicted relative to the personal computer 2800, or portions thereof, may be stored in the remote memory storage device or other locations on the LAN or WAN. The network connections shown are exemplary, and other means of establishing a communications link between the computers may be used.

In some examples, a logic device such as a field programmable gate array, other programmable logic device (PLD), an application specific integrated circuit can be used, and a general purpose processor is not necessary. As used herein, processor generally refers to logic devices that execute instructions that can be coupled to the logic device or fixed in the logic device. In some cases, logic devices include memory portions, but memory can be provided externally, as may be convenient. In addition, multiple logic devices can be arranged for parallel processing.

The invention claimed is:

1. A ripple carry circuit for quantum ternary addition, comprising:
   a first n-qutrit register that includes n qutrits, the n qutrits including a least significant qutrit, at least one intermediate qutrit, and a most significant qutrit that store a least significant trit value, at least one intermediate trit value, and a most significant trit value, respectively, wherein n is a positive integer;
   a second n-qutrit register that includes n qutrits, the n qutrits including a least significant qutrit, at least one intermediate qutrit, and a most significant qutrit that store a least significant trit value, at least one intermediate trit value, and a most significant trit value, respectively;
   a carry qutrit;
   a first carry circuit coupled to the least significant qutrit of the first n-qutrit register and the least significant qutrit of the second n-qutrit register so as to produce and store a carry value associated with a sum of the least significant trit values stored in the first and second n-qutrit registers;
   n−2 carry circuits serially coupled to respective intermediate qutrits of the first n-qutrit register and the second n-qutrit register, wherein a $k^{th}$ carry circuit is coupled to a preceding carry circuit so as to receive a carry value associated with a sum of $(k-1)^{th}$ trit values and to $k^{th}$ qutrits of the first and second n-qutrit registers so as to receive $k^{th}$ trit values stored in the first and second n-qutrit registers, the $k^{th}$ carry circuit producing and storing a $k^{th}$ carry value in a $k^{th}$ qutrit of the second n-qutrit register;
   an $n^{th}$ carry circuit coupled to an $n^{th}$ qutrit of the first n-qutrit register and an $n^{th}$ qutrit of the second n-qutrit register so as to receive nth trit values stored in the first and second n-qutrit registers, wherein the $n^{th}$ carry circuit is coupled to an $(n-1)^{th}$ carry circuit so as to receive an $(n-1)^{th}$ carry value, the $n^{th}$ carry circuit producing an $n^{th}$ carry value based a sum of the $n^{th}$ trit values in stored in the first and second n-qutrit registers and the $(n-1)^{th}$ carry value; and
   an adder circuit coupled to the $n^{th}$ carry circuit so as to couple the $n^{th}$ carry value to the $n^{th}$ carry circuit.

2. The ripple carry adder circuit of claim 1, further comprising n inverse carry circuits, wherein:
   the adder circuit comprises n adder circuits;
   a first inverse carry circuit is coupled to the $n^{th}$ carry circuit and a $P^t$ adder circuit of the n adder circuits so as to produce a sum of the $n^{th}$ trit values from the $n^{th}$ qutrit of the first and second n-qutrit registers and the carry value from the $(n-1)^{th}$ carry circuit, and
   the $k^{th}$ inverse carry circuit is coupled to the $(n-k)^{th}$ carry circuit and a preceding inverse carry circuit and a $k^{th}$ adder circuit so as to produce a sum of the $(n-k)^{th}$ trit values from the $(n-k)^{th}$ qutrit of the first and second n-qutrit registers and the carry value from the preceding carry circuit, wherein k is an integer k=1, . . . , n−1.

3. The ripple carry adder circuit of claim 2, wherein each of the n adder circuits includes a first sum gate coupling the kth qutrit of the first n-qutrit register to the kth qutrit of the second n-qutrit register and a second sum gate coupling the $(k-1)^{th}$ qutrit of the second n-qutrit register to the $k^{th}$ qutrit of the second n-qutrit register.

4. The ripple carry adder circuit of claim 2, wherein each of the n adder circuits includes a first sum gate coupling the $k^{th}$ qutrit of the first n-qutrit register to the kth qutrit of the second n-qutrit register.

5. The ripple carry adder circuit of claim 1, further comprising n inverse carry circuits and n−1 adder circuits, wherein:
   a first inverse carry circuit is coupled to the $n^{th}$ carry circuit and a P adder circuit of the n adder circuits so as to produce a sum of the $n^{th}$ trit values from the $n^{th}$ qutrit of the first and second n-qutrit registers and the carry value from the $(n-1)^{th}$ carry circuit, and
   the $k^{th}$ inverse carry circuit is coupled to the $(n-k)^{th}$ carry circuit and a preceding inverse carry circuit and a $k^{th}$ adder circuit so as to produce a sum of the $(n-k)^{th}$ trit values from the $(n-k)^{th}$ qutrit of the first and second n-qutrit registers and the carry value from the preceding carry circuit, wherein k is an integer k=1, . . . , n−2.

6. The ripple carry adder circuit of claim 5, further comprising an $n^{th}$ adder circuit coupled to the $n^{th}$ inverse carry circuit, wherein the $n^{th}$ adder circuit is coupled to the $(n-1)^{th}$ inverse carry circuit so as to produce a sum of the $0^{th}$ trit values from the $0^{th}$ qutrit of the first and second n-qutrit registers.

7. The ripple carry adder circuit of claim 6, wherein the $n^{th}$ adder circuit is coupled to the $(n-1)^{th}$ inverse carry circuit so as to produce the sum of the $0^{th}$ trit values from the $0^{th}$ qutrit of the first and second n-qutrit registers on the $0^{th}$ qutrit of the second register.

8. A method of ternary addition, comprising:
   representing a first n-trit ternary number and a second n-trit ternary number in a first n-qutrit quantum register and a second n-qutrit quantum register, respectively;
   with n carry status indicator circuits coupled to respective qutrits of the first n-qutrit register and the second n-qutrit register, establishing carry status indicators for trits having adjacent indices in corresponding ancillary qutrits based on trit values in the first n-qutrit quantum register and the second n-trit quantum register;
   in a plurality of merging circuits, merging the carry status indicators to find carry status indicator values for non-adjacent indices; and
   based on the merged carry status indicators, storing a sum of the first and second n-trit ternary numbers in an output quantum register, wherein the sum is generated in n pairs of quantum adder circuits.

9. The method of ternary addition of claim 8, wherein the sum of the first and second n-trit ternary numbers is stored in at least one of the first n-qutrit quantum register and the second n-qutrit register.

10. The method of ternary addition of claim 8, wherein the sum of the first and second n-trit ternary numbers is stored in an n-qutrit ancilla register.

11. The method of ternary addition of claim 8, wherein the merging of the carry status indicators to find carry status indicator values for non-adjacent indices alters values stored in the first n-qutrit register and the second n-qutrit register, and further comprising inverse merging so as to restore the first n-trit ternary number to the first n-qutrit register and the second n-trit ternary number to the second n-qutrit register.

12. The method of ternary addition of claim 8, wherein the merging the carry status indicators to find carry status indicator values for non-adjacent indices comprises determining carry status indicators associated with a least significant trit of at least one the first n-trit ternary number and the second n-trit ternary number and a most significant trit of at least one of the second n-trit ternary number and the first n-trit ternary number, respectively.

13. A ternary quantum adder for adding n-trit numbers, wherein n is a positive integer, comprising:

n carry status indicator circuits coupled to respective qutrits of a first n-qutrit register and a second n-qutrit register associated with a first summand and a second summand, respectively, so as to determine carry status indicator values associated with adjacent qutrits and store the carry status indicator values on qutrits of at least one ancilla register;

a plurality of merging circuits coupled to the qutrits of the first n-qutrit register, the second n-qutrit register, and the at least one ancilla register so as to store carry status indicators values associated with a coupling of the low qutrits of at least one of the first n-qutrit register and the second n-qutrit register to respective higher qutrits of at least one of the first quantum register and the second quantum register in the at least one ancilla register; and n pairs of quantum adder circuits coupled to the at least one ancilla qutrit and the qutrits of the first n-qutrit register and the second n-qutrit register so as to sum trit values of the corresponding qutrits of the first n-qutrit register, the second n-qutrit register, and the at least one ancilla register to produce and store a ternary sum of the first summand and the second summand.

14. The ternary quantum adder of claim 13, comprising a plurality of inverse merging circuits coupled to the qutrits of the first n-qutrit register, the second n-qutrit register, and the at least one ancilla register so as to receive values stored on the qutrits of the first n-qutrit register and the second n-qutrit register by at least one of the plurality of merging circuits so as to restore values associated with the first summand and the second summand.

15. The ternary quantum adder of claim 13, wherein the ternary sum is stored in the at least one ancilla register.

16. The ternary quantum adder of claim 15, wherein the ternary sum is stored in at least one of the first n-qutrit register and the second n-qutrit register.

* * * * *